United States Patent [19]

Reynolds

[11] 4,194,144
[45] Mar. 18, 1980

[54] CONSTANT VELOCITY DRIVING MEANS

[75] Inventor: Jack H. Reynolds, Bellbrook, Ohio

[73] Assignee: NCR Corporation, Dayton, Ohio

[21] Appl. No.: 813,191

[22] Filed: Jul. 5, 1977

[51] Int. Cl.² ............................ H02P 5/34; H02P 5/40
[52] U.S. Cl. ................................. 318/341; 318/314; 318/318; 318/603
[58] Field of Search ............... 318/602, 603, 305, 562, 318/314, 318, 341, 415; 235/92 CC, 92 PE

[56] References Cited
U.S. PATENT DOCUMENTS

| 3,105,927 | 10/1963 | Flatten et al. | 318/562 |
| 3,617,715 | 11/1971 | Dummernauth | 318/562 |
| 3,666,930 | 5/1972 | McDaniel | 318/562 |
| 3,789,195 | 1/1974 | Meier et al. | 235/92 PE |
| 3,824,378 | 7/1974 | Johnson et al. | 235/92 CC |
| 3,843,814 | 10/1974 | Carlson et al. | 318/341 |
| 3,887,122 | 6/1975 | Sommeria | 318/603 |
| 3,950,682 | 4/1976 | Dohanich, Jr. | 318/314 |

Primary Examiner—David Smith, Jr.
Attorney, Agent, or Firm—J. T. Cavender; Albert L. Sessler, Jr.; Elmer Wargo

[57] ABSTRACT

An apparatus and method for controlling the velocity of a moving member like, for example, a print head carrier. The apparatus includes motor means which drives the carrier along the platen of a printer. The motor is driven by alternately energizing it during an "on" period and de-energizing it during an "off" period. A velocity detector detects the actual velocity of the carrier and determines whether an overspeed or an underspeed condition exists relative to a desired velocity. A counter capable of counting pulses relative to the on and off periods is utilized to receive the signals from the velocity detector and to effectively shorten or lengthen the "on" period, respectively, whenever an overspeed or underspeed condition exists.

26 Claims, 18 Drawing Figures

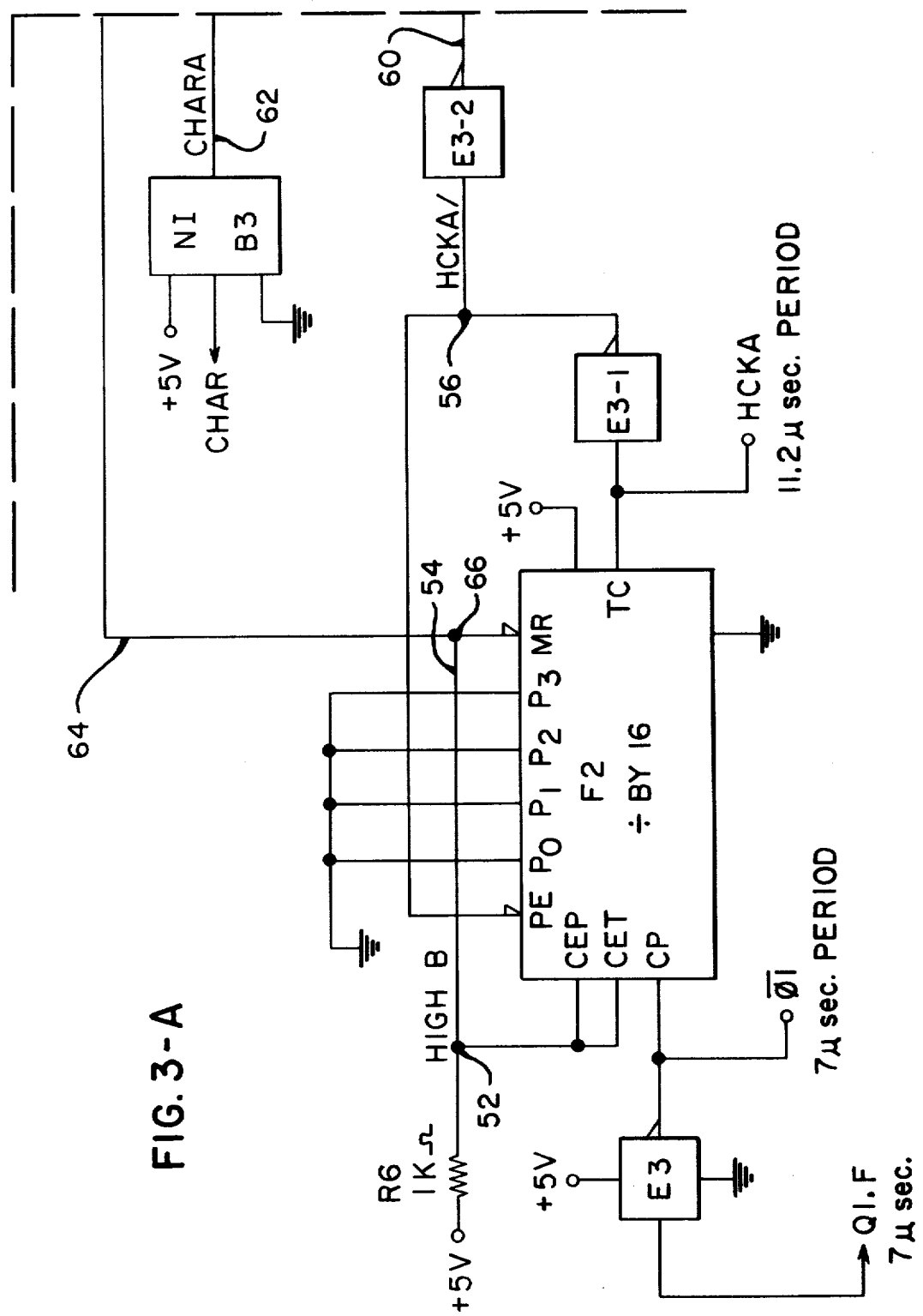
FIG. 3-A

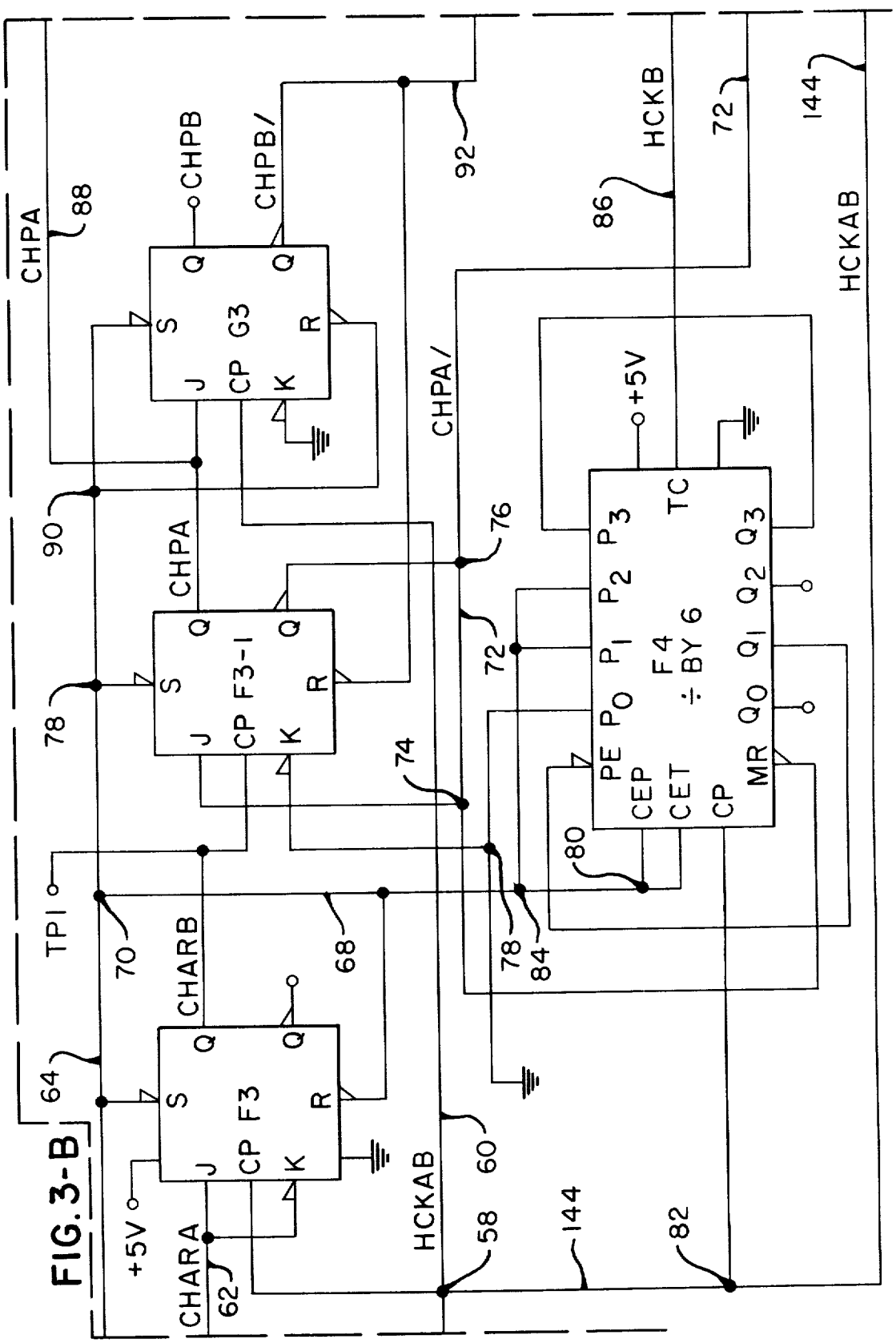
FIG. 3-B

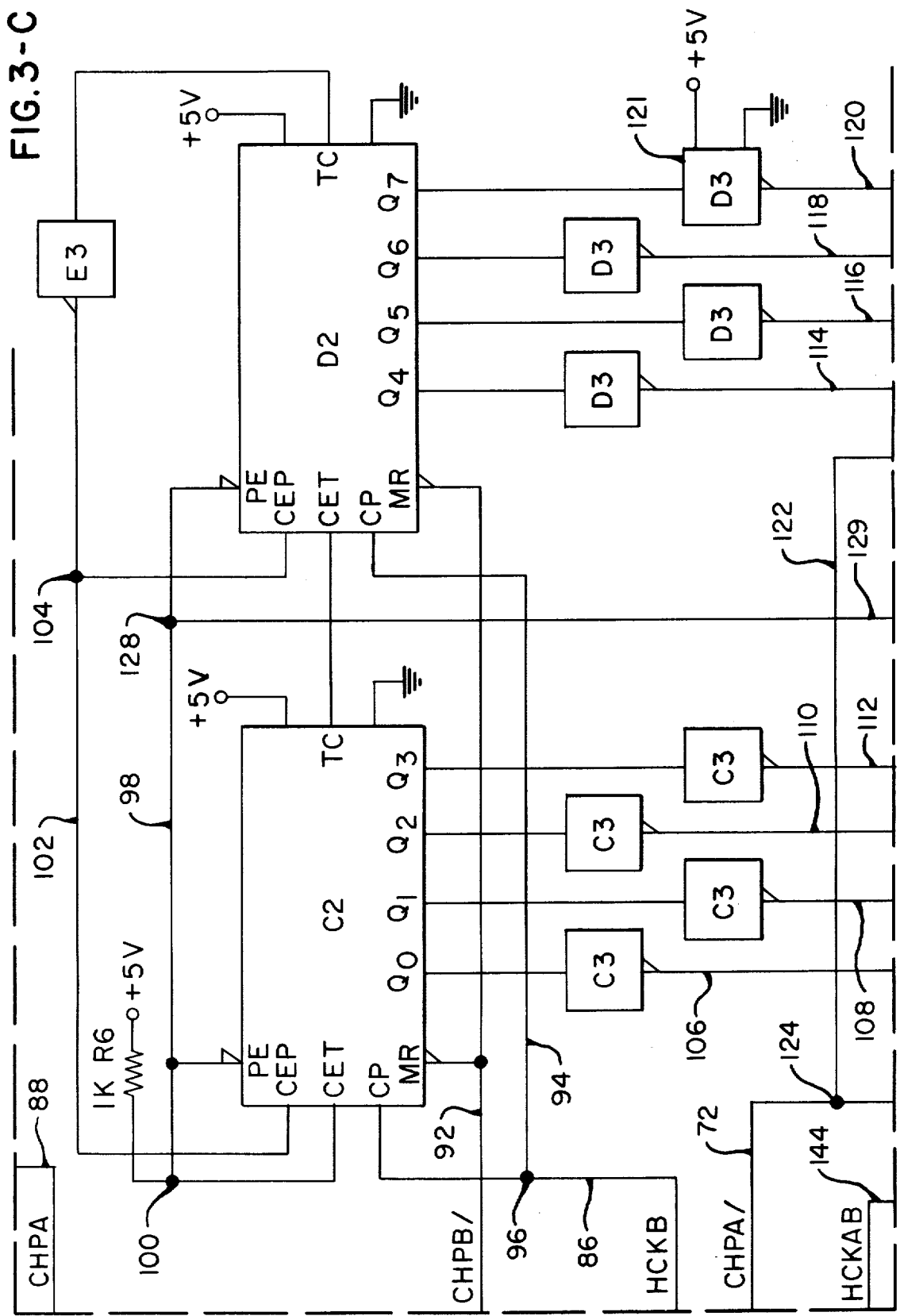

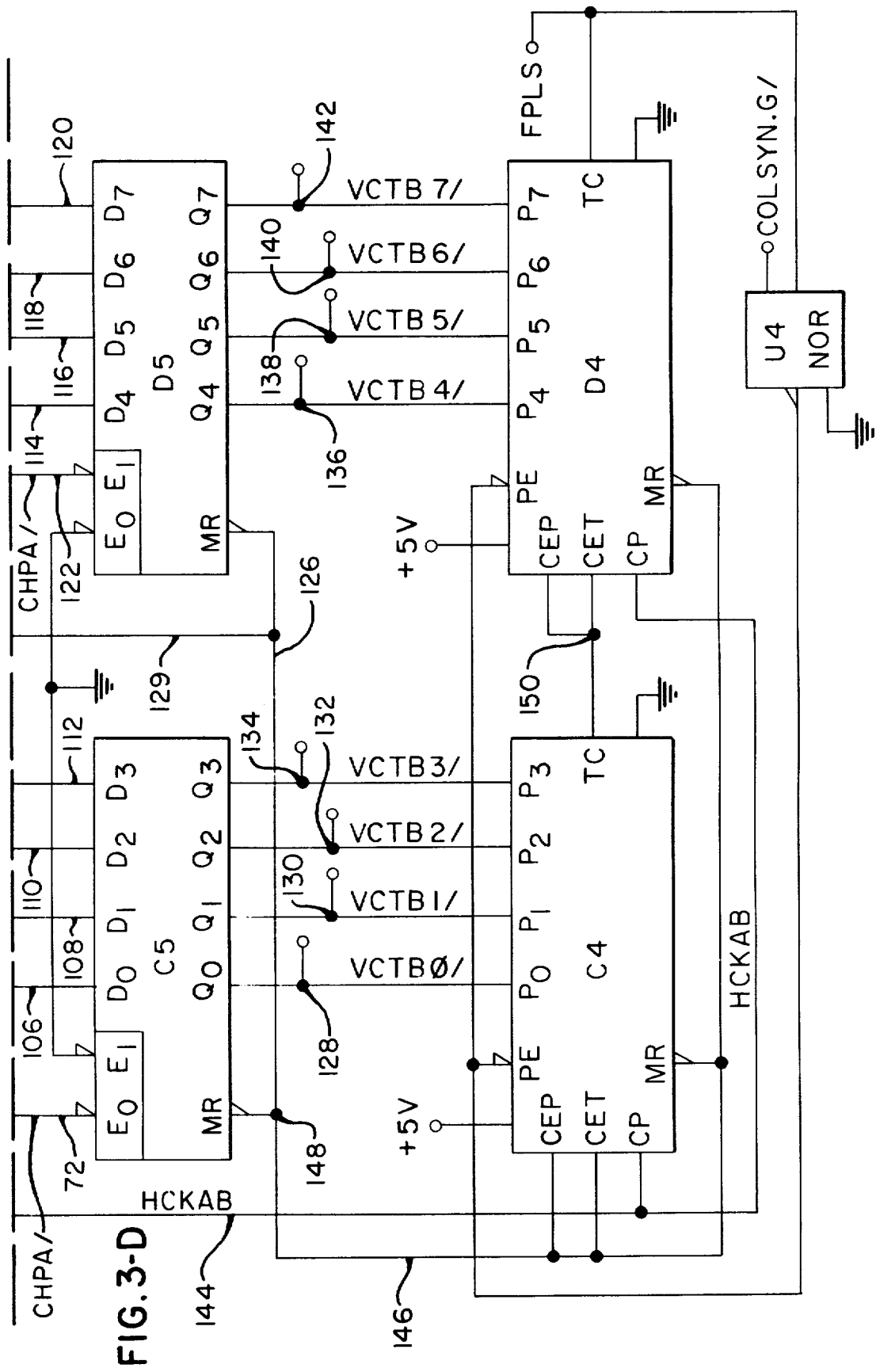

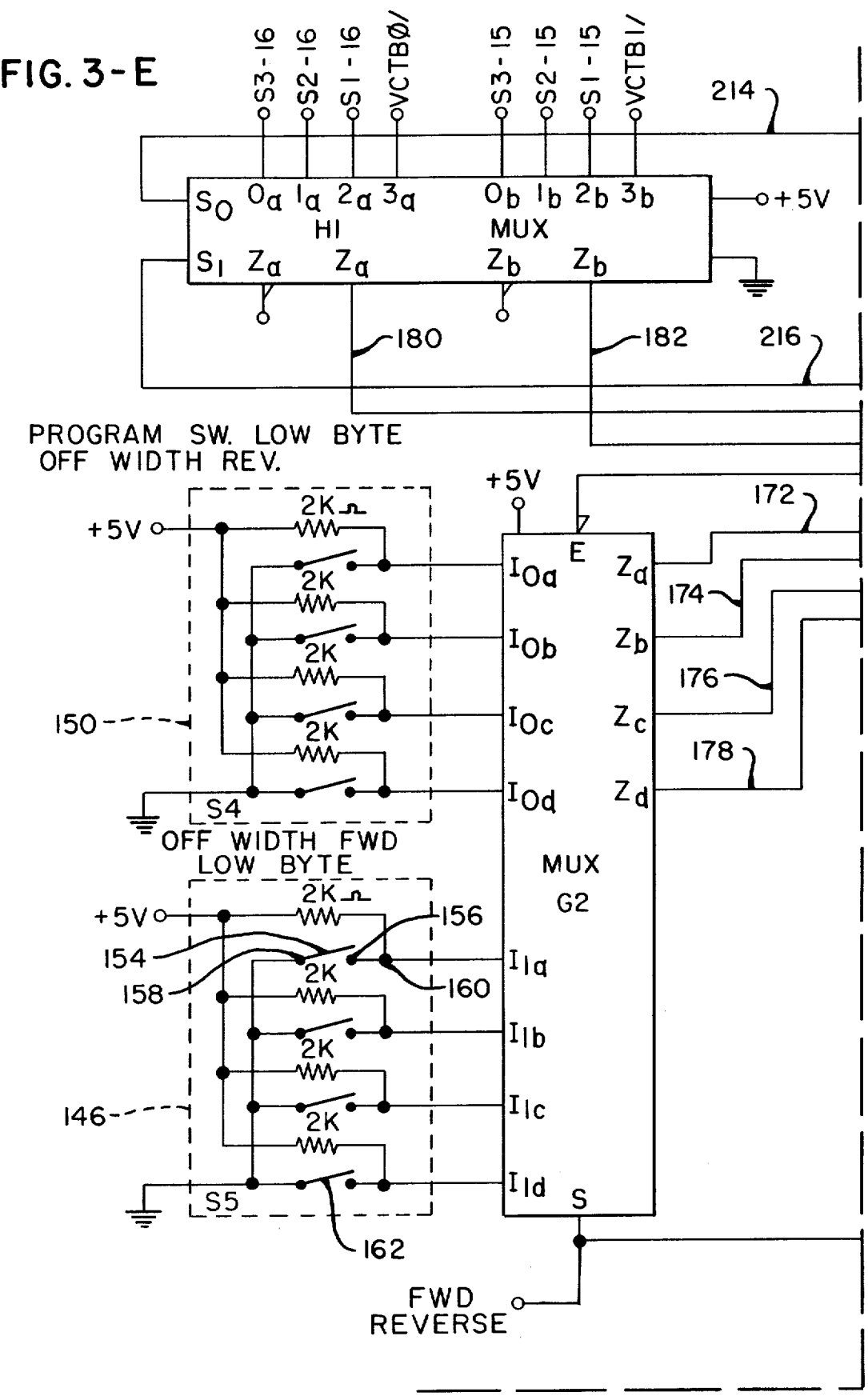
FIG. 3-E

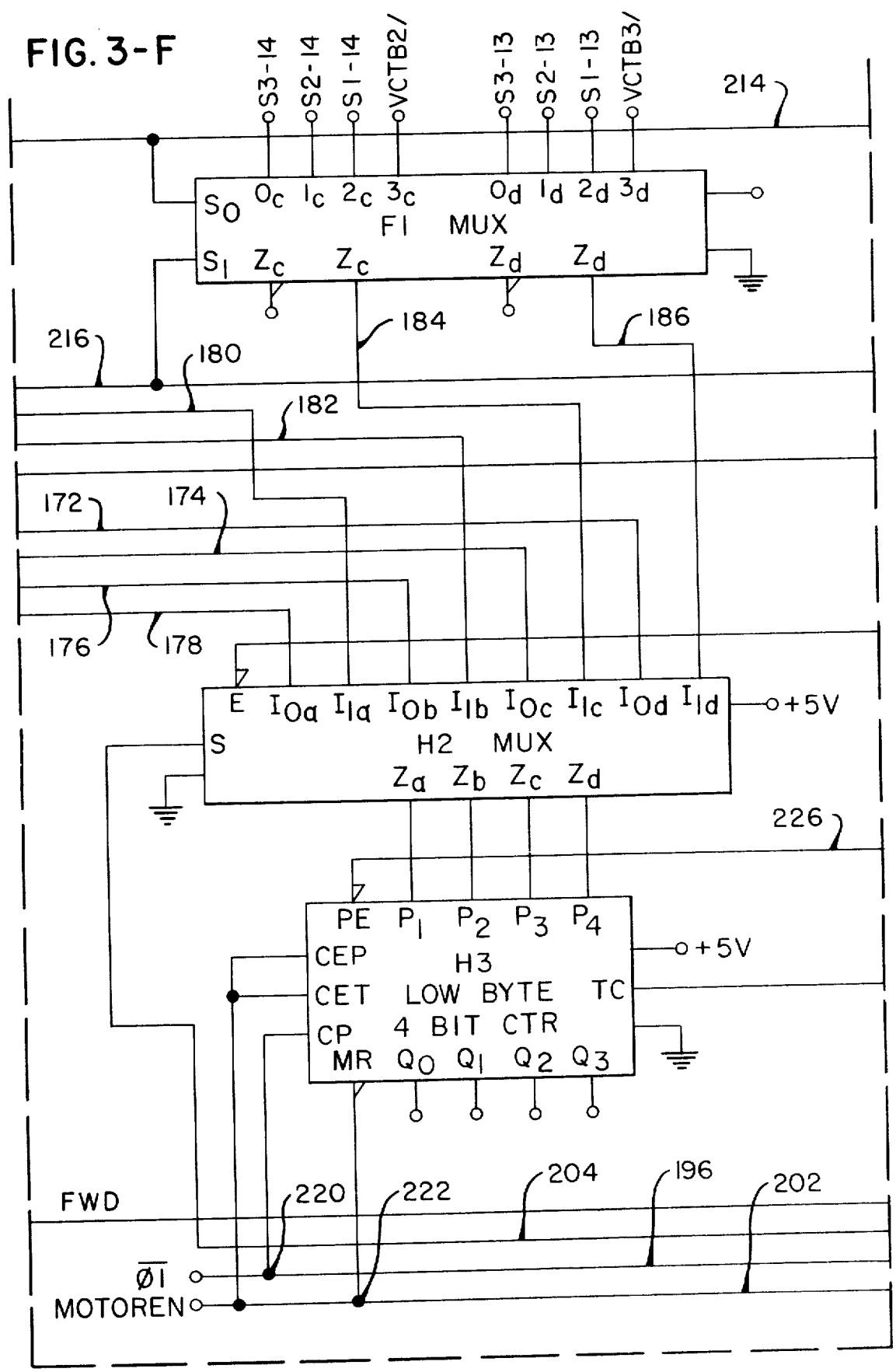
FIG. 3-F

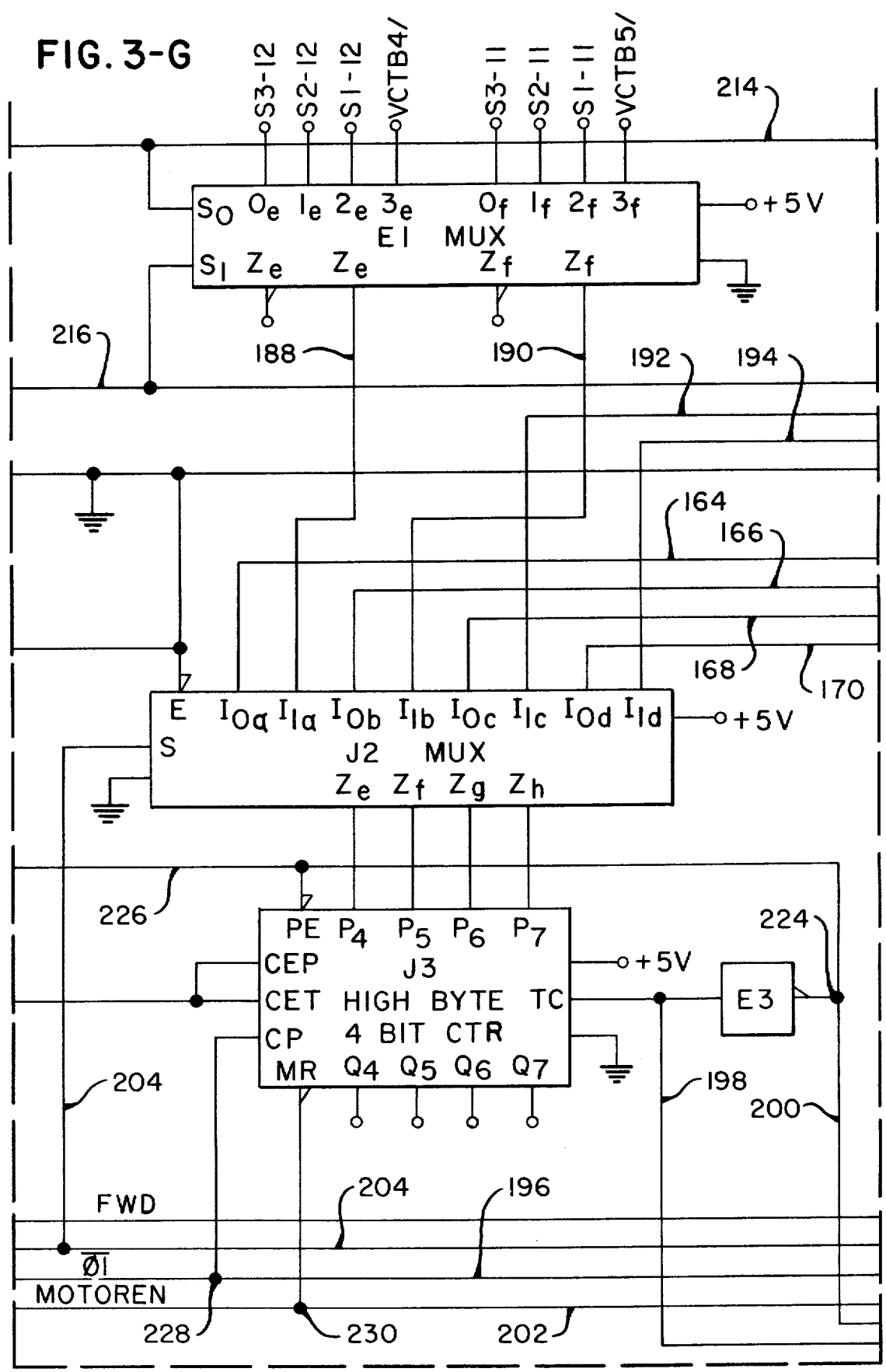

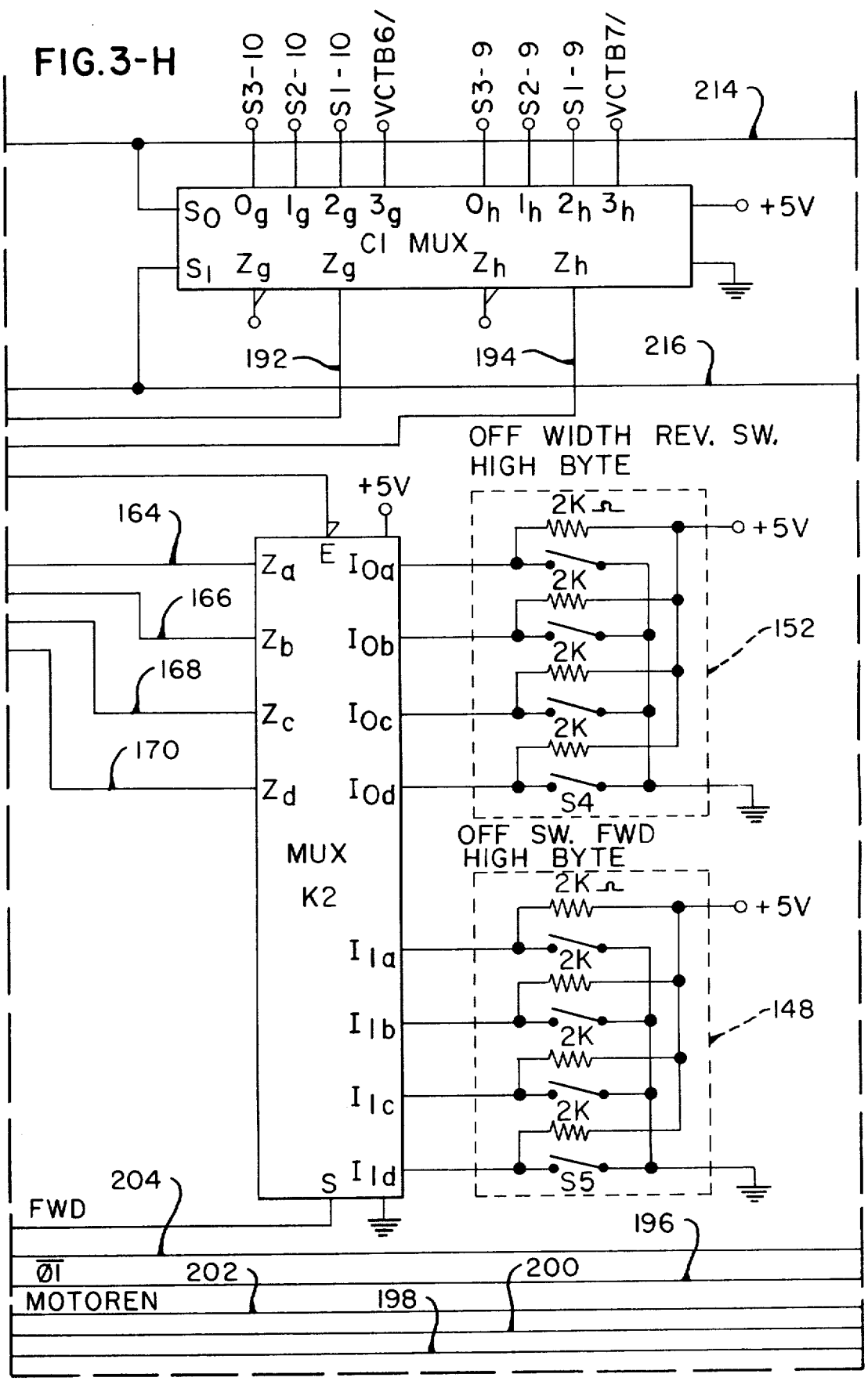
FIG.3-H

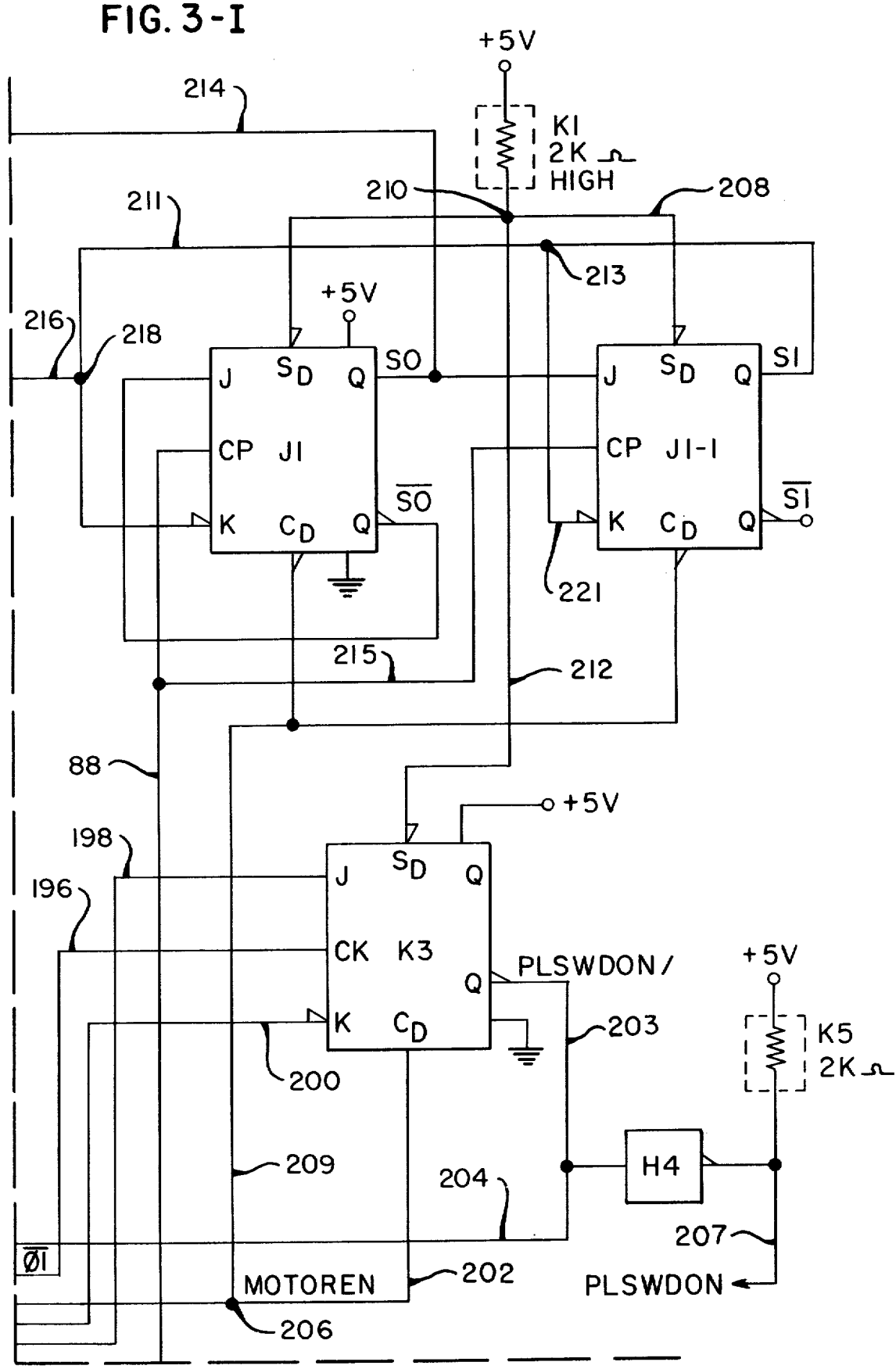
FIG. 3-I

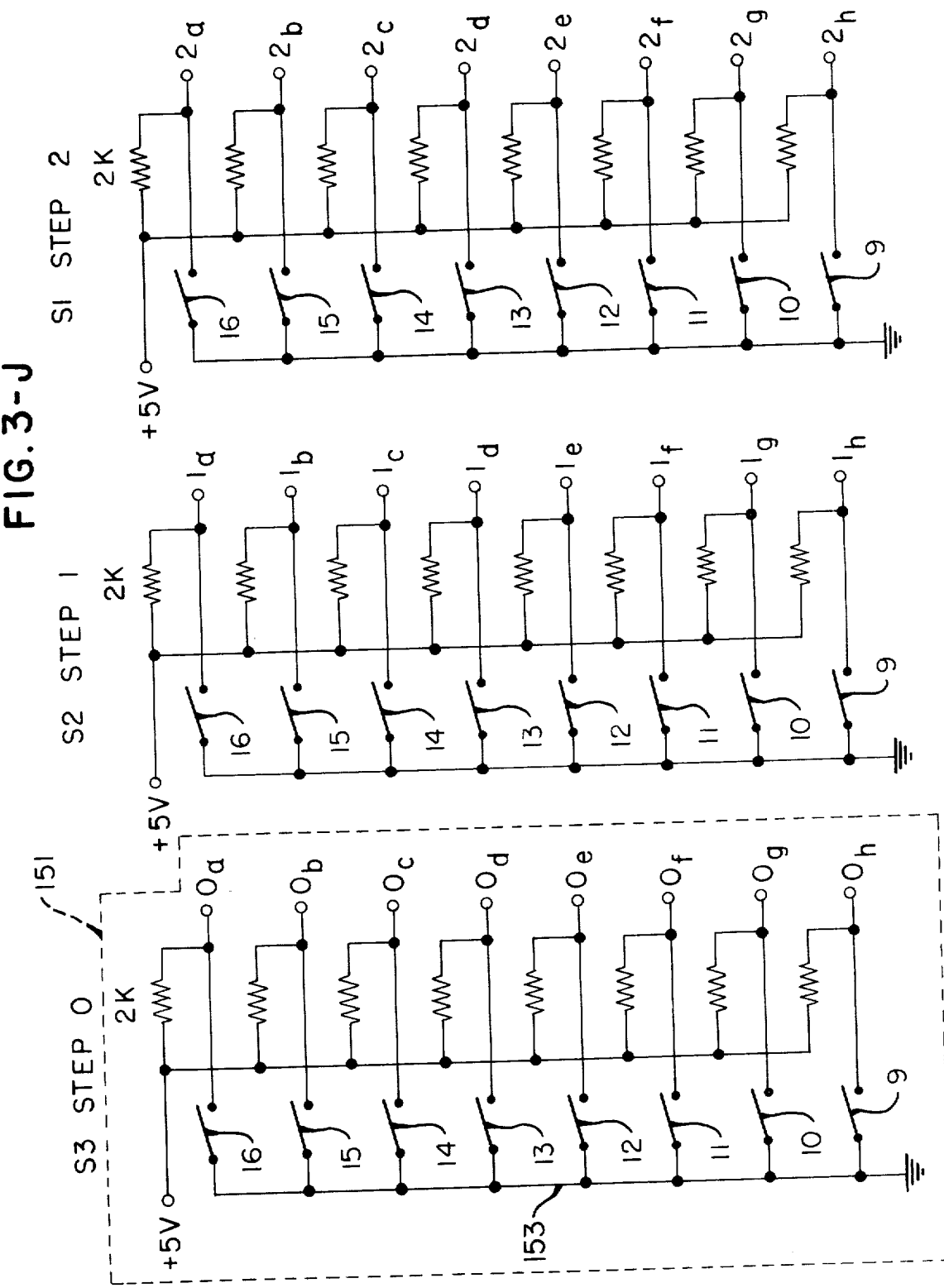
FIG.3-J

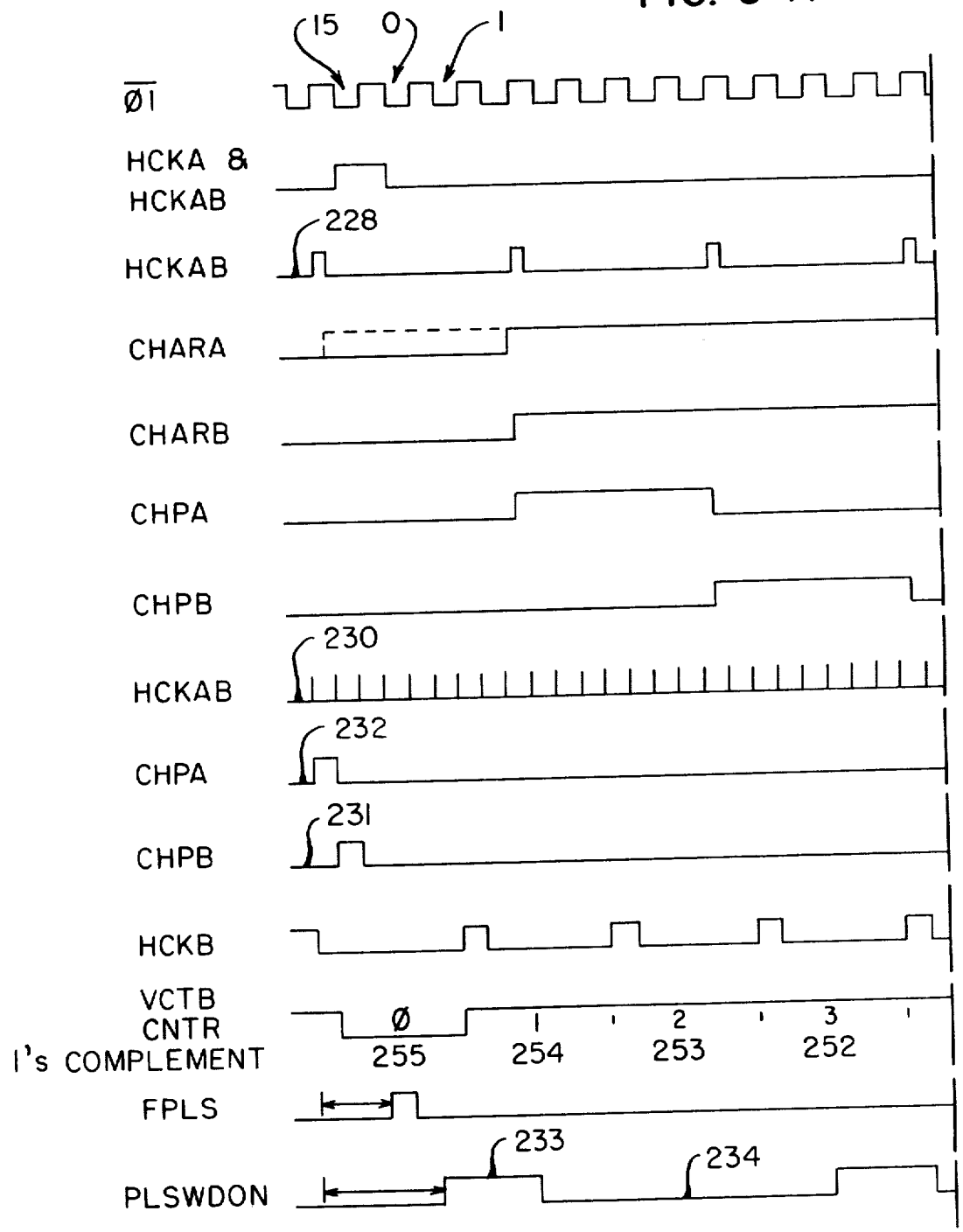
FIG. 5-A

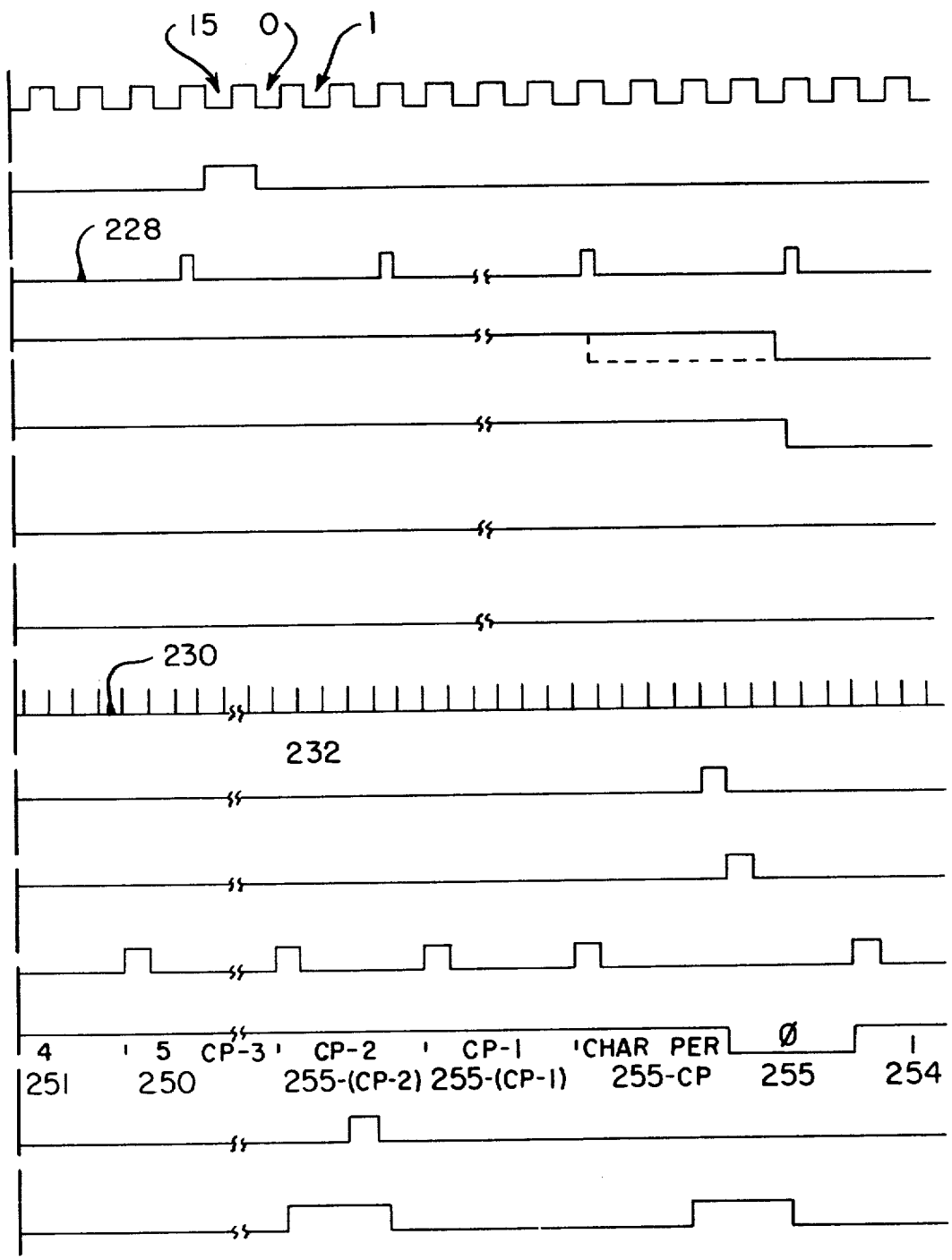
FIG. 5-B

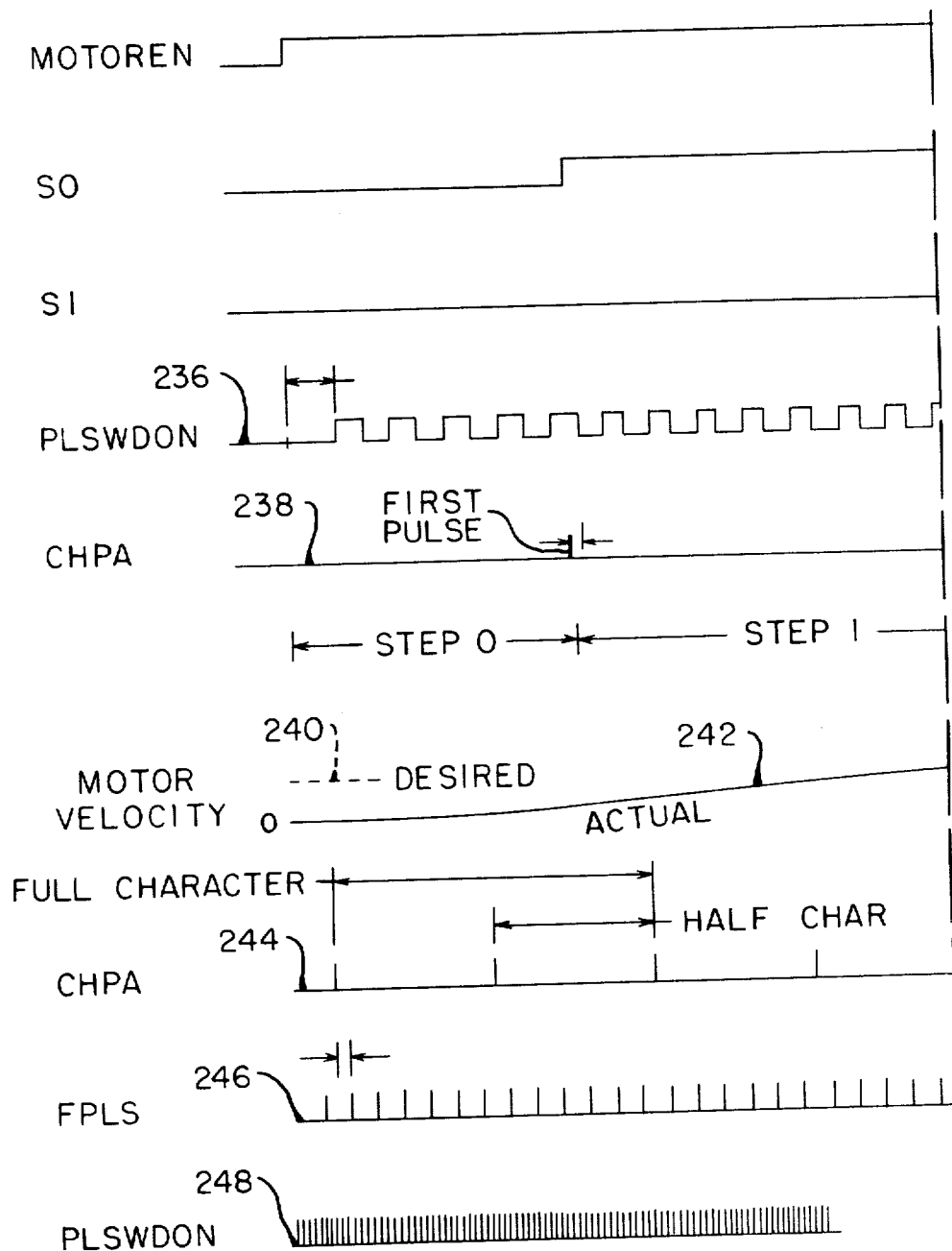
FIG. 5-C

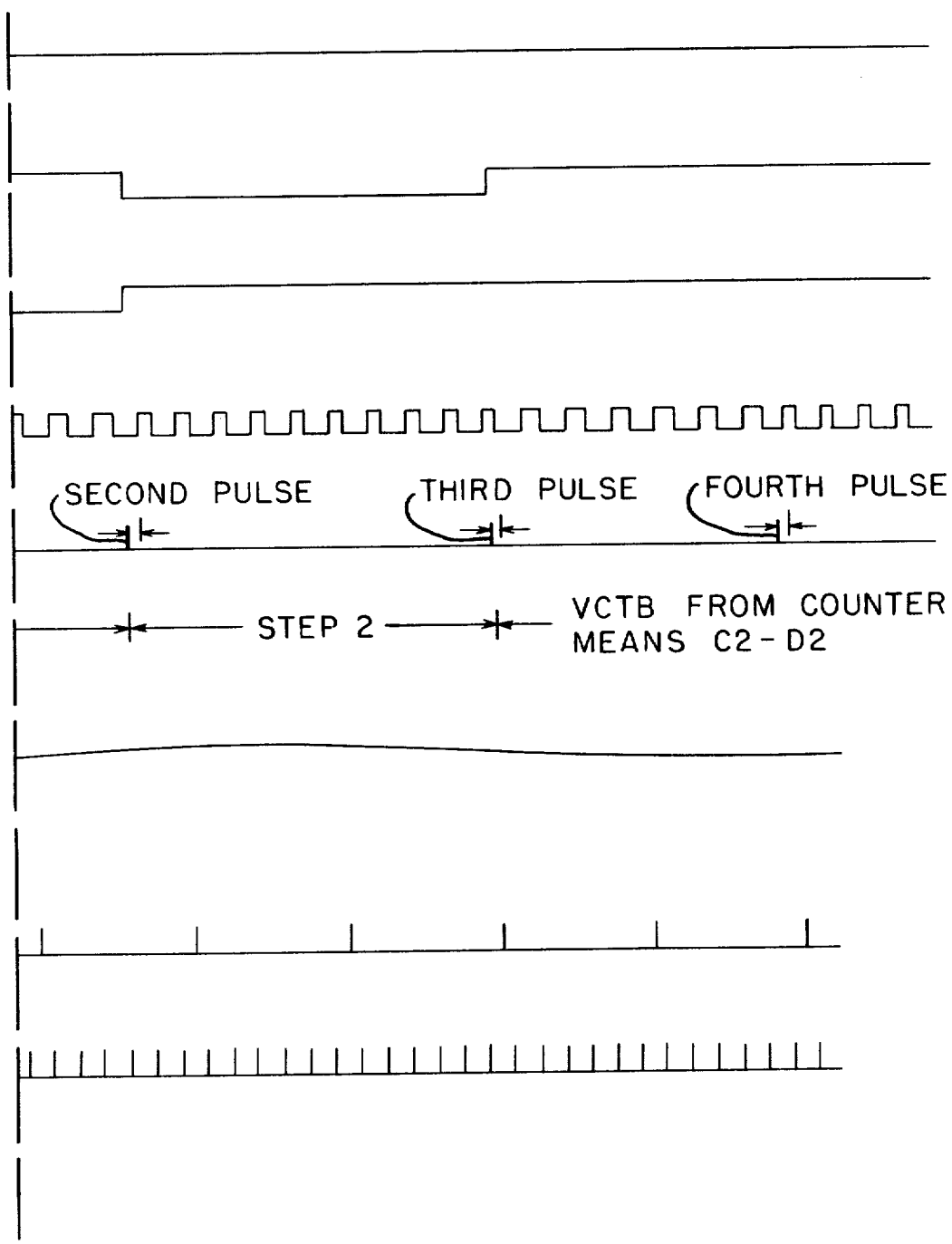
FIG. 5-D

CONSTANT VELOCITY DRIVING MEANS

BACKGROUND OF THE INVENTION

This invention relates to an apparatus and method for accurately controlling the velocity of a moving member, like a print head carrier, for example, which moves along the platen of a printer, and for providing timing signals for printing uniformly spaced dots when using a wire matrix printer as the printing element, even with some variation in the velocity of the print head carrier.

Most systems of the prior art utilize a tachometer which is coupled to the drive shaft of the motor driving the print head carrier, and the tachometer is used to feed back an analog signal which is proportional to the speed of the motor. The analog signal is then compared with a reference signal in a comparator means which controls the operating speed of the motor by a variety of techniques disclosed in the prior art. One system disclosing an electronic tachometer is shown in U.S. Pat. No. 3,986,091.

The preferred embodiment of the present invention utilizes a completely digital-to-digital circuit for controlling the speed of a moving member such as a print head carrier, thereby making the control of the speed more accurate than prior art systems which employ analog circuitry.

SUMMARY OF THE INVENTION

This invention relates to an apparatus and method for controlling the velocity of a moving member as, for example, a print head carrier in a printer. The apparatus includes a motor drive means which is operatively coupled to the moveable member to move it along the platen of the printer in the example given. The motor of the motor drive means is driven by alternately energizing it during an "on" period and de-energizing during an "off" period. Velocity detection means are utilized to produce signals which are indicative of the actual velocity of the moveable member whose velocity is to be controlled with respect to a desired velocity, and circuit means operatively couple the velocity detection means with the motor drive means to enable the motor to drive the moveable member at the desired constant velocity.

The circuit means includes means for establishing predetermined on and off periods for the motor when the moveable member is moving at the desired velocity, and means for continually inversely varying the duration of the "on" period energizing the motor in accordance with a time period measured between predetermined signals from said velocity detection means whenever the actual velocity of the moving member deviates from the desired velocity. The circuit means is completely digital, making the control of the velocity of the moveable member more accurate when compared to prior art systems employing digital-to-analog and analog-to-digital converters in the speed control system.

When this invention is used in a wire matrix printer environment, for example, it can provide accurate timing signals for printing uniformly spaced dots comprising a character even with some variation in the velocity of the moveable member or carriage supporting the wire matrix print head.

An added feature of this invention is that standard, medium-scale, integrated devices can be used for minimum cost and maximum flexibility of design. Because the circuit of this invention is functionally modular, it is suitable for large scale integration.

Another feature of this invention is that it produces a first waveform comprising first pulses and portions interconnecting said first pulses, with said first pulses having widths which vary inversely according to the time intervals between successive predetermined pulses of a second waveform.

Still another feature of this invention is that it uses a single digital counter for generating recurrent pulses having controlled different on and off intervals.

These advantages and others will become more apparent from the following specification, claims and drawing.

BRIEF DESCRIPTION OF THE DRAWING

FIGS. 3(A-J) taken together represent a detail schematic drawing of the control means shown in FIG. 2;

FIGS. 5(A-D) taken together represent the timing diagram used with this invention.

DETAILED DESCRIPTION OF THE INVENTION

Figure 1:
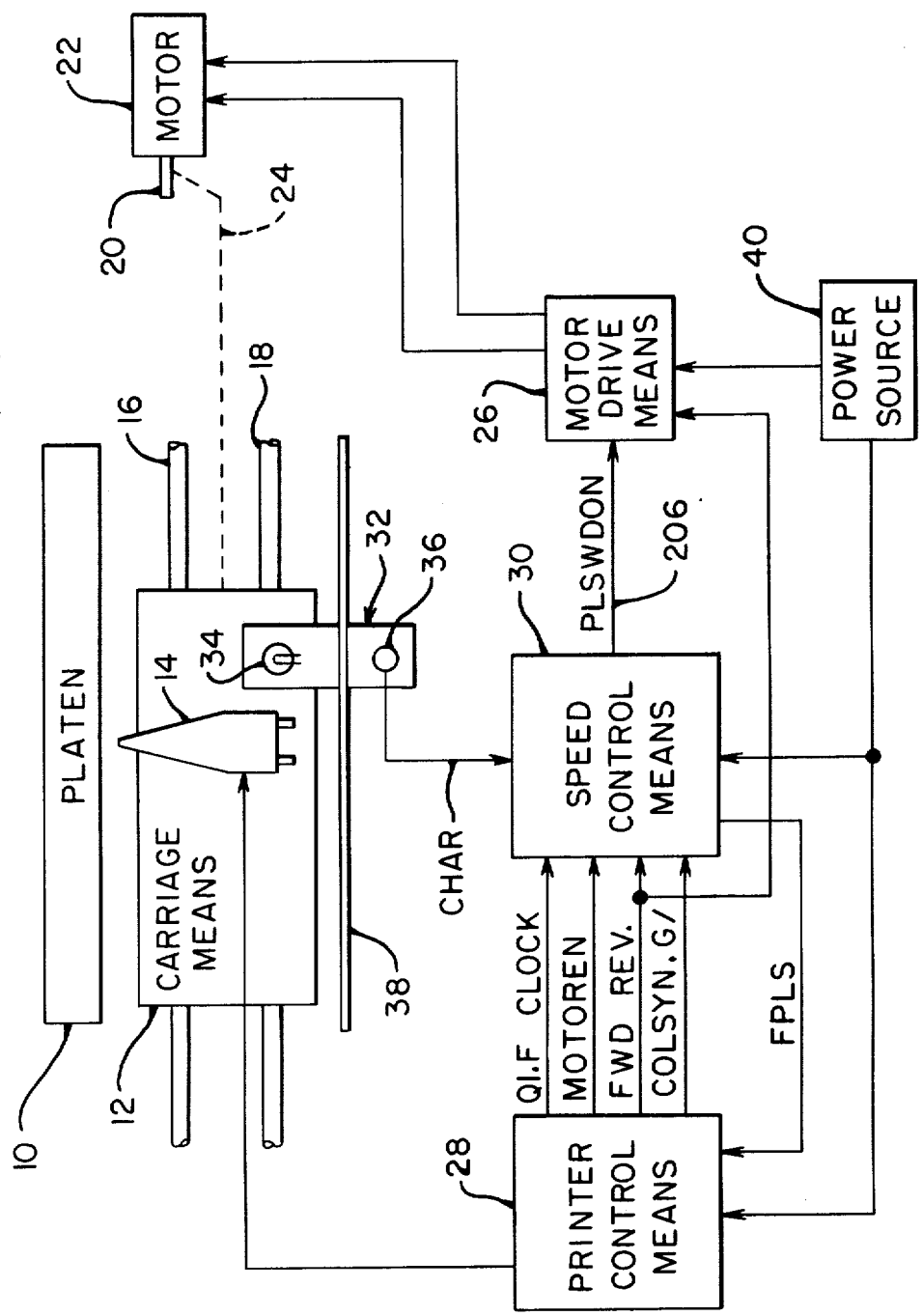
FIG. 1 is a general diagrammatic view of the apparatus of this invention as used in a typical embodiment such as a wire matrix printer, showing a carriage means having a wire matrix printer thereon, a motor which is operatively connected to the carriage means to drive it, a motor drive means for driving the motor, velocity sensing means located on the moveable member or carriage means, a printer control means for controlling a wire matrix printer located on the carriage means, and speed control means for controlling the velocity of the carriage means.

FIG. 1 is a general diagrammatic view of a preferred embodiment of the apparatus of this invention as used in a typical application such as a wire matrix printer. The printer may be conventional and includes a platen 10, a carriage means 12, and a wire matrix printer 14 mounted on the carriage means 12. The carriage means 12 is moveably supported on fixed guide rods 16 and 18 to enable the carriage means to be reciprocated relative to platen 10. The output shaft 20 of motor 22 is conventionally coupled to the carriage means 12 by suitable connecting means 24 to reciprocate it along the platen 10. Because the connecting means 24 may be conventional, such as a traversing lead screw or a belt and pulley system, it is shown only as a dashed line in FIG. 1. The motor 22 is preferably a conventional DC motor, and it is selectively energized by a conventional motor drive means shown only as a block 26. A conventional printer control means 28 is operatively connected to the wire matrix printer 14 so as to control the firing of the individual solenoids in the wire matrix printer 14. The printer control means 28 may include a conventional terminal control unit or a microprocessor, and because this aspect may be conventional, the printer control means 28 is not described in any further detail.

The speed control means 30 of this invention receives the output from a velocity sensing means 32, and uses this information to control the speed of motor 22 so as to maintain the velocity of the carriage means 12 constant relative to a desired velocity. The velocity sensing means 32 includes a light source 34 and a detector such as a photoelectric cell 36 which are positioned on opposed sides of a timing strip 38. The timing strip 38 is stationary relative to the velocity sensing means 32 which is secured to the carriage means 12 to travel therewith. The timing strip 38 is made of opaque material and has a plurality of equally spaced slots therein which enable light from the light source 34 to pass therethrough to the photoelectric cell 36, and the time period between successive pulses from photoelectric cell 36 gives an indication of the actual velocity of the carriage means 12 as it is traversed along the platen 10. A conventional power source 40 is utilized to provide the necessary voltage levels to the motor drive means 26, the speed control means 30, and the printer control means 28.

Figure 2:
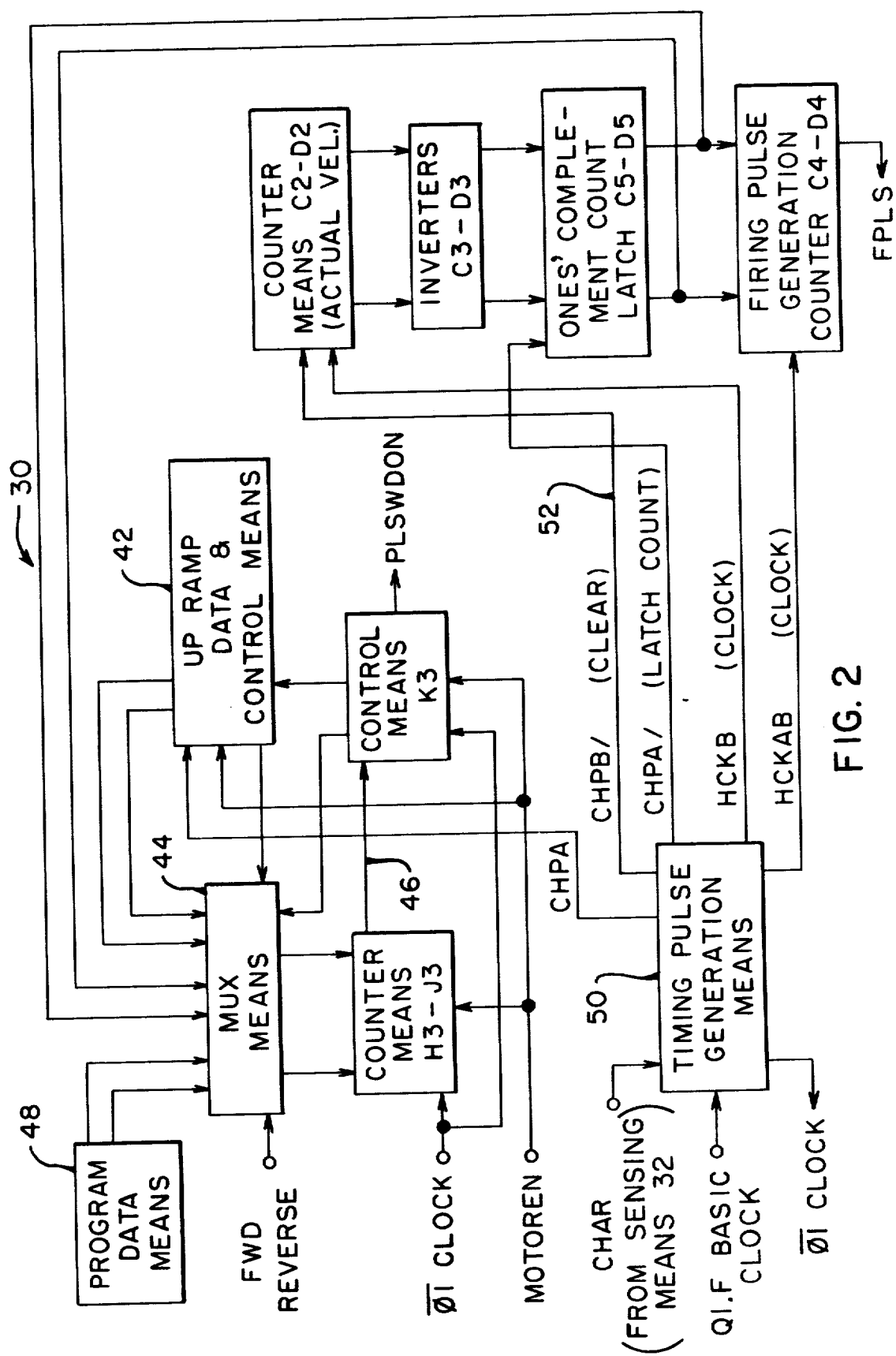
FIG. 2 is a general schematic diagram in block form, showing more details of the speed control means shown in FIG. 1.
Figure 6:
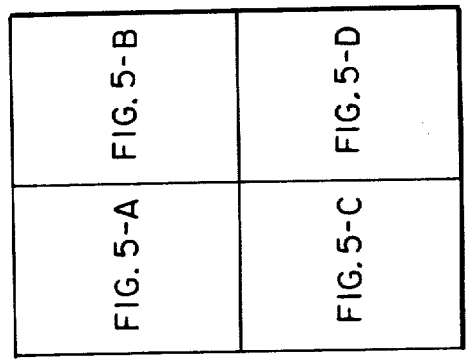
FIG. 6 is a diagram showing how the individual drawings FIGS. 5(A-D) are arranged to form a composite drawing.

FIG. 2 is a general schematic diagram, in block form, showing additional details of the speed control means 30 shown in FIG. 1, and is used to provide a general description thereof. In the previous description it was noted that the velocity of the carriage means 12 is controlled by alternately energizing the motor 22 during a so-called "on" period and de-energizing the motor 22 during a so-called "off" period. The output of speed control means 30 includes a pulse marked PLSWDON which is fed into the motor drive means 26 (FIG. 1) for conventionally controlling the energization of motor 22. When pulse PLSWDON is a binary 1 for example, the motor 22 is conventionally energized via the motor drive means 26 and when the pulse PLSWDON is a binary 0, the motor 22 is de-energized. The pulse PLSWDON comes from the control means K3 shown in FIG. 2. In general, the on period for energizing motor 22 and the off period for de-energizing it are designed so that the on period will represent about twenty-five percent of the total duty cycle time for the motor 22.

Assume for the moment, that the motor 22 (FIG. 1) is at rest and it is desired to move the carriage means 12 to the desired operating velocity so as to begin printing. To initiate the control, a MOTOREN pulse, coming from the printer control means 28 of FIG. 1, is used to reset the counter means H3-J3, the control means K3, and the up ramp data and control means 42 shown in FIG. 2. The up ramp data and control means 42 includes a series of manually-settable switches for entering binary counts thereon (as will be described in detail later herein) for providing a gradual starting up to desired velocity or up ramp control for the motor 22. A forward pulse marked FWD on FIG. 2 and coming from the printer control means 28 of FIG. 1 conditions the multiplexing means 44 to multiplex a predetermined first binary count coming from the up ramp data and control means 42 into the counter means H3-J3 so as to preset the counter means and also conditions the motor drive means 26 to drive the motor 22 in a forward direction. Once the counter means H3-J3 is preset to the predetermined binary count from the up ramp data and control means 42, the $\overline{\phi 1}$ clock coming from the timing pulse generation means 50 increments the counter means H3-J3 from its preset count to the terminal count thereof. The terminal count or output from the counter means H3-J3 is fed via conductor 46 into control means K3, causing it to change state. The output of control means K3 is then fed into the multiplexer means 44 to load the counter means H3-J3 with data related to the de-energizing off period of motor 22.

The data relating to the off period of motor 22 is actually a binary count which corresponds to the desired off-period and is recorded on manually-settable switches located in the program data means 48 in FIG. 2. The count for the desired off period of motor 22 from the program data means 48 is then preset into the counter means H3-J3 by the multiplexing means 44, and the $\overline{\phi 1}$ clock is fed into the counter means H3-J3, incrementing it from the preset count entered thereon to its terminal count. When the terminal count is reached, the control means K3 flips or changes to its opposite state so that now the speed control means 30 will cause the on period of the motor 22 to again follow.

It should be noted at this time, that if the motor 22 is starting from rest, the velocity sensing means 32 will not produce any signal until such time as motor 22 causes sensing means 32 to move past one of the timing slots on the timing strip 38 shown in FIG. 1. The predetermined binary counts which were recorded in the up ramp data and control means 42 (FIG. 2) and the program data means 48 are alternately multiplexed into the counter means H3-J3 for several such cycles until the carriage means 12 moves sufficiently far to enable the sensing means 32 to coact with the timing strip 38 to produce a first pulse which is called CHAR and is shown on FIGS. 1 and 2.

The first CHAR pulse coming from the sensing means 32 is fed into the timing pulse generation means 50 (FIG. 2) which will be described in detail hereinafter. For the moment, it is sufficient to state the timing pulse and generation means 50 produces a CHPA pulse (derived from the CHAR pulse) which is routed to the up ramp data and control means 42, causing a second binary count to be preset upon the counter means H3-J3 via the multiplexing means 44 to control the next group of energizing on periods for the motor 22. The counter means H3-J3 is then incremented to its terminal count via the $\overline{\phi 1}$ clock, whereupon, the control means K3 changes state, causing the multiplexing means 44 to multiplex a predetermined binary count (corresponding to the de-energizing off period of motor 22) into the counter means H3-J3. The $\overline{\phi 1}$ clock then increments the counter means H3-J3 until its terminal count is reached, whereupon, the control means K3 changes state to condition the multiplexing means 44 to again multiplex the second binary count from the up ramp data and control means 42 into the counter means H3-J3. This process of alternately loading the second binary count from the up ramp data and control means 42 and the binary count (for the de-energizing off period for motor 22) from program data means 48 into the counter means H3-J3 continues until the motor 22 moves the carriage means 12 sufficiently far to enable the velocity sensing means 32 to produce a second CHAR pulse as the motor 22 gains speed.

The second CHAR pulse coming from the velocity sensing means 32 is then utilized by the timing pulse generation means 50 (FIG. 2) to produce a second CHPA pulse which is routed to the up ramp data and control means 42, thereby conditioning the multiplexing means 44 to multiplex a third and final binary count from the up ramp data and control means 42 into the counter means 44 as previously described. This third binary count and the binary count for the off period from program data means 48 are alternately fed into the counter means H3-J3 as previously described until the motor 22 moves the carriage means 12 sufficiently far to obtain a third CHAR pulse from the velocity sensing means 32; at this time the motor 22 is usually moving the carriage means 12 (and print head 14 thereon) at a speed or velocity which is close to the desired velocity. The third CHAR pulse completes the up ramp control for the motor 22.

The third CHAR pulse coming from the velocity sensing means 32 produces a third CHPA pulse from the timing pulse generation means 50 (FIG. 2), and this latter pulse conditions the multiplexing means 44 to accept data associated with the counter means C2-D2 which relates to the actual velocity of the carriage means 12 and wire matrix printer 14. In general, binary count data associated with the actual velocity of the carriage means 12 as represented by data initially entered in counter means C2-D2 and binary count data from program data means 48 are alternately multiplexed into the counter means H3-J3 by the techniques already generally described.

The third CHAR pulse which is derived from the velocity sensing means 32 (FIG. 1) is fed into the timing pulse generation means 50 shown in FIG. 2 to also produce the pulse CHPB/ which is fed to the counter means C2-D2 by a conductor 52 to reset it. As soon as the counter means C2-D2 is reset, an HCKB clock, coming from the timing pulse generation means 50, is fed into the counter means C2-D2 to increment it, causing a binary count to be accumulated therein. The clocking rate of pulse HCKB in the example being discussed is 96 times slower than the clock $\phi 1$ used for incrementing counter means H3-J3. As a count is accumulated in the counter means C2-D2, the count is inverted by the inverters C3-D3, and the ones' complement thereof is fed in parallel into the latch means C5-D5. Because the motor 22 is now moving the carriage means 12 at a velocity approaching the desired velocity, the next CHAR signal coming from the velocity sensing means 32 will occur within a relatively short time after the preceding one. This CHAR signal is used by the timing pulse generation means 50 to produce a CHPA/ pulse which conditions the latch C5-D5 so as to store therein the ones' complement count of the binary count in the counter means C2-D2. Because the counter means H3-J3 has already been reset by the control means K3 to receive data about the on period for energizing the motor 22, the ones' complement count coming from latch C5-D5 will be multiplexed into the counter means H3-J3 by the multiplexer means 44. The $\overline{\phi 1}$ clock is then fed into the counter means H3-J3 causing it to increment from the preset count (from latch C5-D5) which was just entered therein. When the counter means H3-J3 reaches its terminal count, the terminal count signal will be passed over conductor 46 to the control means K3, causing it to change state to initiate the de-energizing off period for motor 22. The multiplexing means 44 is then conditioned by the control means K3 to receive count data from the program data means 48 relative to the de-energizing off period as previously explained.

In order to illustrate the various counts used during the off periods and on periods related to the energization and de-energization of motor 22, assume for the moment that when the motor 22 is driving the carriage means 12 and wire matrix printer 14 at the desired velocity, the on count which is accumulated in counter means C2-D2 (an eight bit counter) will be 71 and will be recorded in binary form. When the count from counter means C2-D2 is inverted by the inverters C3-D3 and fed into the latch C5-D5, a binary count of 71 in counter means C2-D2 will be recorded as a binary count of 184 in latch C5-D5 which is an eight bit latch. This count of 184 is then parallel loaded into the eight bit counter means H3-J3 by the multiplexer means 44 as previously described.

It can be seen that with a binary count of 184 in counter means H3-J3, the counter means will produce its terminal count signal after 71 $\overline{\phi 1}$ clocking pulses are received; i.e., a count of 184 plus a count of 71 equal a total count of 255 which equals the maximum count of an eight bit binary counter. The 71 clocking pulses which are fed into counter means H3-J3 represent the on period for the motor 22 when the motor is moving the carriage means 12 at the desired velocity. As stated earlier herein, the on period is designed so as to present a duty cycle of twenty-five percent for the motor 22. Since the off period for the motor 22 is there times the on period (for a duty cycle of 25%), the count representing the time period when the motor is off or de-energized is equal to three times 71 or 213. In order to obtain a time period representing or corresponding to a count of 213 in the counter means H3-J3, manually settable switches in program data means 48 are set so as to produce a binary count of 42 for the off period of the motor 22. Accordingly, when the multiplexer means 44 loads the counter means H3-J3 with a binary count of 42, the counter means will have to be incremented fron 42 up to a count of 255 (making a total count of 213) prior to the terminal count of the counter means being reached. When the terminal count is reached, the control means K3 changes state and conditions the multiplexer means 44 to multiplex the count from counter means C2-D2 (after inversion) into the counter means H3-J3 as previously explained. It should be noted that as long as the motor 22 drives the carriage means 12 at a constant velocity, a count of 71 will be recorded in the counter means C2-D2 between successive CHAR pulses coming from the velocity sensing means 32.

Assume for the moment, that the carriage means 12 shown in FIG. 1 is driven at a rate faster than the desired nominal velocity. This means that during the on period for the energization of motor 22, there will be fewer HCKB clocking pulses coming from the timing pulse generation means 50 of FIG. 2 and being recorded upon the counter means C2-D2. If, for example, a count of 65 is recorded on counter means C2-D2 between successive CHAR pulses, then the ones' complement thereof will be recorded on latch C5-D5 as a binary count of 190. This binary count of 190 is then multiplexed into the counter means H3-J3 as previously explained so as to preset the counter means to a count of 190. Thus, the terminal count from counter means H3-J3 will be reached after 60 $\overline{\phi 1}$ clocking pulses instead of the usual 71 pulses which occur when the carriage means 12 is moving at the desired constant velocity. Because the terminal count is reached sooner in counter means H3-J3 under these conditions, the duration of the on time period for the energization of motor 22 will be curtailed or shortened. In the embodiment disclosed herein, the off period for the motor 22 remains constant; however, the on period for the energization of the motor is inversely varied according to the count received from the counter means C2-D2 so as to maintain the actual velocity of the moveable member or carriage means 12 at the desired velocity. The derivation for the counts for the on period and the off period for the motor 22 will be described in detail hereinafter. At this point it should be noted that the frequency of the energizing on pulse PLSWDON (for energizing motor 22) coming from the speed control means 30 in FIG. 2 is about 5 KHz in the embodiment illustrated. Naturally, the energizing frequency is dependent upon the specific parameters chosen for the various elements included in the apparatus of this invention and the response times, etc. of the particular conventional motor drive means 26 selected to drive the motor 22 and the particular motor 22.

Figure 4:
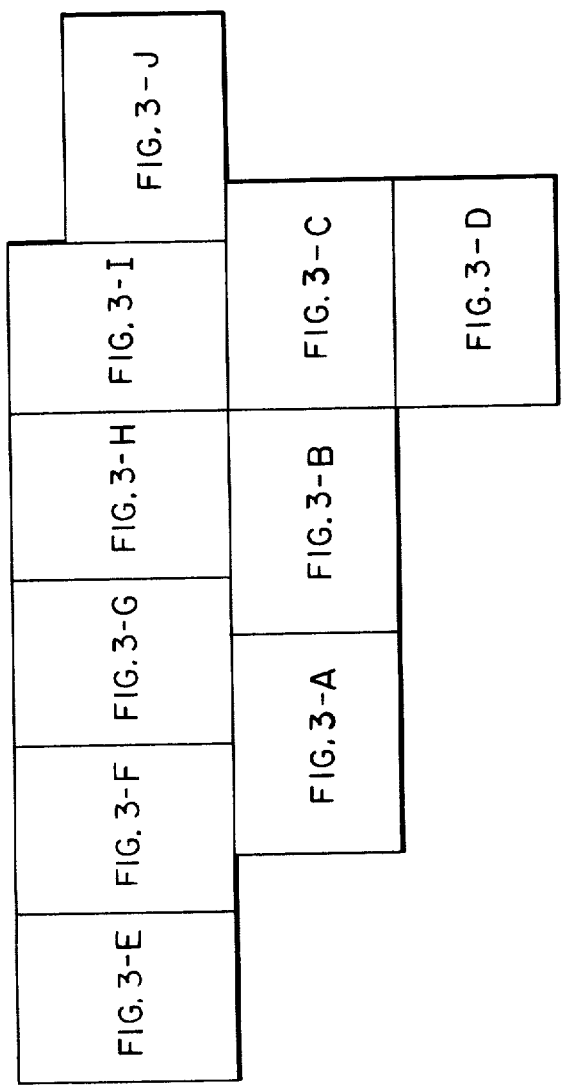
FIG. 4 is a diagram showing how the individual FIGS. 3(A-J) are arranged to form a composite drawing.

FIGS. 3(A-J) taken together represent a detailed schematic drawing of the speed control means 30 shown in FIG. 2. FIG. 4 is a diagram showing how the individual FIGS. 3-A through 3-J are arranged to form a composite drawing for the control means 30 shown therein.

With reference to FIG. 3-A, a clocking pulse Q1.F coming from the printer control means 28 is fed into the inverter E3 which is a conventional Fairchild 9016 inverter, having the usual +5 volt source potential and system ground connected thereto as shown. The output of the inverter E3 is fed into the CP input of a conventional Fairchild 9316 binary counter F2. The output of inverter E3 is also utilized as the $\overline{\phi 1}$ clock which is used to increment the counter means H3-J3, as shown in FIGS. 3F and 3-G, for example. The counter F2 is conventionally wired so as to obtain a divide-by-sixteen function therefrom. In this regard, the CEP and CET inputs are connected to junction 52, which in turn, is connected to a +5 volt source of potential via a 1000 ohm resistor R6. The $P_0$, $P_1$, $P_2$ and $P_3$ inputs to the counter F2 are connected to system ground. The master reset MR input to counter F2 is connected to junction 52 via a conductor 54. The terminal count output TC from counter F2 is fed into the input of a conventional inverter E3-1. The output of inverter E3-1 is fed into the parallel enable input PE of counter F2, and the output of inverter E3-1 is also fed into the input of inverter E3-2 via junction 56. The output of inverter E3-2 is fed to the junction 58 in FIG. 3-B via a conductor 60. In the example given, the basic clock Q1.F coming from the printer control means 28 (FIG. 1) has a period of 0.7 microseconds and is inverted by the inverter E3 to provide the clock $\overline{\phi 1}$ which also has a period of 0.7 microseconds. The TC output of counter F2 provides the clock HCKA having a period of 11.2 microseconds. After inversion by inverter E3-1, clock HCKA becomes HCKA/ which is again inverted by inverter E3-2 to become clock HCKAB shown in FIG. 3B.

The CHAR signal (FIG. 3-A) coming from the velocity sensing means 32 of FIG. 1 is fed into a conventional non-inverter NI, such as number 4050 manufactured by Motorola. The non-inverter NI gives good noise immunity without inverting the incoming signal, and it has the usual system ground and a +5 volt source of potential connected thereto as shown. The output from the non-inverter NI (also marked as CHARA) is fed into the J input of flip-flop F3 shown in FIG. 3-B via conductor 62.

The flip-flops F3, F3-1, and G3 shown in FIG. 3-B are conventional 9024 flip-flops, manufactured by Fairchild. The J and K inputs of flip-flop F3 are connected together so as to enable flip-flop F3 to function as a D type flip-flop. The HCKAB signal coming from the output of inverter E3-2 of FIG. 3-A is fed to the CP input of flip-flop F3 from junction 58. The set input S of flip-flop F3 is connected to the conductor 64 which is connected to the conductor 54 at junction 66 as shown in FIG. 3-A. The reset input R to flip-flop F3 is connected to the conductor 68 which is also connected to conductor 64 at junction 70. The Q output from flip-flop F3 which is also marked CHARB is fed into the CP input of flip-flop F3-1. The J input and the $\overline{Q}$ output of flip-flop F3-1 are connected to a conductor 72 at junction points 74 and 76, respectively. The S input of flip-flop F3-1 is connected to conductor 64 at junction 78. The K input to flip-flop F3-1 is connected to system ground at junction 78.

The counter F4 shown in FIG. 3-B is a Fairchild 9316 counter which is conventionally wired to produce a divide-by-six function. The CEP and CET input terminals of counter F4 are connected to conductor 68 at junction 80, and the clock pulse input CP thereof is connected to the conductor 60 via junction 82. The Q1 output of counter F4 is connected to the parallel enable PE input thereof. The Q3 output of counter F4 is connected to the P3 input thereof, and the P0 input thereof is connected to system ground via junction 78. The $P_1$ and $P_2$ inputs of counter F4 are connected to conductor 68 at junction 84. The TC or terminal count output (also marked HCKB) of counter F4 is fed into the CP input of counter C2 shown on FIG. 3-C via conductor 86. The master reset MR input of counter F4 is connected to the conductor 72 at junction 74.

The HCKAB signal arriving over conductor 60 in FIG. 3-B is fed into the CP input of flip-flop C3. The Q output also marked CHPA from flip-flop F3-1 is fed into the J input of flip-flop G3. This CHPA signal from flip-flop F3-1 is also fed into the flip-flops J1 and J1-1 shown in FIG. 3-I via conductor 88. The S and R inputs of flip-flop G3 are connected to the conductor 64 at junction 90. The $\overline{Q}$ output of flip-flop G3 also marked CHPB/ is connected to the master reset inputs MR of the counters C2 and D2 shown in FIG. 3-C by a conductor 92.

The elements shown in FIGS. 3-A and 3-B comprise the timing pulse generation means 50 shown in FIG. 2, and the various pulses emanating therefrom will be discussed later herein in relation to the timing diagrams shown in FIGS. 5-A through 5-D.

The counters C2 and D2 shown in FIG. 3-C comprise the counter means C2-D2 shown in FIG. 2 and are conventional Fairchild 9316 4-bit binary counters which are connected together as shown to form an 8-bit counter. The clear pulse CHPB/ coming from the $\overline{Q}$ output of flip-flop G3 of FIG. 3-B is fed into the master reset inputs MR of counters C2 and D2. The HCKB clock coming from the terminal count or TC output of counter F4 of FIG. 3-B via conductor 86 is fed into the CP input to counter C2 and is also fed into the CP input of counter D2 by conductor 94 which is connected to conductor 86 at junction 96. The parallel enable inputs PE of counters C2 and D2 are connected together by conductor 98 which is also connected to the junction 100. Junction 100 is connected to a source of +5 volts potential via a 1000 ohm resistor R6. The count enable parallel inputs CEP to counters C2 and D2 are connected together by a common conductor 102 at a junction 104. The terminal count or TC output of counter C2 is fed into the CET input of counter D2, and the terminal count or TC output of counter D2 is fed into the input of inverter E3 whose output is fed to junction 104. Each of the counters C2 and D2 is conventionally connected to a source of +5 volts potential and the system ground as shown.

The $Q_0$, $Q_1$, $Q_2$, $Q_3$ outputs from counter C2 are fed into conventional inverters marked C3 in FIG. 3-C, and the respective outputs from these inverters are fed into the inputs $D_0$, $D_1$, $D_2$, and $D_3$ of latch C5 shown in FIG. 3-D via conductors 106, 108, 110 and 112 respectively. Similarly, the $Q_4$, $Q_5$, $Q_6$ and $Q_7$ outputs of counter D2 are fed into individual inverters marked D3, whose outputs are fed to the inputs $D_4$, $D_5$, $D_6$ and $D_7$ of latch D5 in FIG. 3-D via conductors marked 114, 116, 118 and 120, respectively. The inverters C3 and D3 shown in FIG. 3-C (and also shown in FIG. 2) are conventional Fairchild 9016 inverters, and have the usual system ground and +5 volt connections thereto as shown by the inverter D3, also marked as 121 in FIG. 3-C.

The binary count which is recorded on the counters C2 and D2 of FIG. 3-C and which corresponds to the actual velocity of the carriage means 12 is inverted by the inverters C3 and D3, and the inverted count or ones' complement of the count which was recorded on the counters C2-D2 is fed into the latches C5 and D5 of FIG. 3-D. The latches C5 and D5 are Fairchild 9308 dual 4-bit latches. The CHPA/ pulse appearing on conductor 72 of FIG. 3-C is fed into the $E_0$ or AND gate input of latch C5 as shown, this same pulse is also fed to the $E_1$ or AND gate input of latch D5 by a conductor 122 which is connected to conductor 72 in FIG. 3-C at junction 124. The $E_1$ input of latch C5 is connected to the $E_0$ input of latch D5, and both these inputs are connected to system ground. The master reset MR inputs of latches C5 and D5 are connected together by a common conductor 126 and the conductor 126 is connected to the conductor 98 in FIG. 3-C at junction 128 by a conductor 129. The master reset inputs of latches C5 and D5 are kept at the high voltage level of junction 100 in FIG. 3-C. The outputs $Q_0$, $Q_1$, $Q_2$ and $Q_3$ of latch C5 are fed respectively into the $P_0$, $P_1$, $P_2$ and $P_3$ inputs of counter C4. Similarly, the outputs $Q_4$, $Q_5$, $Q_6$ and $Q_7$ of latch D5 are fed into the $P_4$, $P_5$, $P_6$ and $P_7$ inputs, respectively, of counter D4. The counters C4 and D4 are conventional Fairchild 9316, 4-bit binary counters which are wired together to provide an 8-bit binary counter.

The ones' complement count of the count (from counter C2-D2) corresponding to the actual velocity of the carriage means 12 of FIG. 1 which is located in the latch C5-D5 of FIG. 3-D is connected to the multiplexing means 44 (FIG. 2) as follows. The $Q_0$ and $Q_1$ outputs from latch C5 in FIG. 3-D also marked $\overline{VCTB\phi}/$ and $\overline{VCTB1}/$ are connected via junctions 128 and 130 to the input terminals $3_a$ and $3_b$, respectively, of multiplexer H1 shown in FIG. 3-E. Similarly, the outputs $Q_2$ and $Q_3$ of latch C5 (also marked $\overline{VCTB2}/$ and $\overline{VCTB3}/$ are connected via junctions 132 and 134 to the input terminals $3_c$ and $3_d$, respectively, of multiplexer F1 shown in FIG. 3-F. The outputs $Q_4$ and $Q_5$ of latch D5 also marked $\overline{VCTB4}/$ and $\overline{VCTB5}/$ are connected via junctions 136 and 138 to the input terminals $3_e$ and $3_f$, respectively, of multiplexer E1 shown in FIG. 3-G. Similarly, the outputs $Q_6$ and $Q_7$ of latch D5 also marked $\overline{VCTB6}/$ and $\overline{VCTB7}/$ are connected via junctions 140 and 142 to the input terminals $3_g$ and $3_h$, respectively, of multiplexer C1 shown in FIG. 3-H. The multiplexers H1, F1, E1 and C1, are conventional Fairchild 9309 multiplexers.

The binary counters C4 and D4 shown in FIG. 3-D comprise the firing pulse generation counter C4-D4 shown in block form in FIG. 2, and these counters are used for the generation of firing pulses to fire the individual solenoids of the wire matrix printer 14 shown in FIG. 1. The HCKAB clock arriving on conductor 144 in FIG. 3-D is derived from the output of inverter E3-2 shown in FIG. 3-A, and is fed into the clock input CP of binary counter C4 and the clock input CP of counter D4. The master reset inputs MR of counters C4 and C5 and the count enable trickle input CET and the count enable parallel input CEP of counter C4 are connected together via a common conductor 146 which is connected to the conductor 126 at junction point 148. The terminal count TC output from counter C4 is fed into the count enable trickle input CET of counter D4, and the count enable parallel input CEP of counter D4 is connected to the CET input thereof at junction 150. The terminal count TC of counter D4 is connected to one of the inputs of a standard NOR gate marked U4. The output of NOR gate U4 is fed into the parallel enable PE input of each of binary counters C4 and D4. The TC output from binary counter D4 is used to provide a firing pulse marked FPLS in FIG. 3-D and FIG. 2. This firing pulse signal FPLS is used by the printer control means 28 shown in FIG. 1 to control the firing of the individual solenoids in the wire matrix printer 14 shown in FIG. 2. A second input to NOR gate U4, which input is marked COLSYN.G/, is derived from the printer control means 28 shown in FIG. 1 and is used to indicate the beginning of a new character for the firing of pulses to the solenoids of the wire matrix printer 14. The use of the counter C4-D4 as it relates to the firing of the individual solenoids of the wire matrix printer 14 will be described later herein.

FIGS. 3-E, 3-F, 3-G and 3-H collectively show the multiplexing means 44 shown schematically in FIG. 2. The multiplexers H1, F1, E1 and C1 are conventional Fairchild 9309, dual 4-input multiplexers, and they are used as two pole, four-position switches. The inputs $0_a$, $1_a$, $2_a$, $0_b$, $1_b$, and $2_b$ of multiplexer H1 are associated with the up ramp control data and control 42 shown in FIG. 2. Similarly, the $0_c$, $1_c$, $2_c$, $0_d$, $1_d$ and $2_d$ inputs of multiplexer F1 shown in FIG. 3-F are also associated with the up ramp data and control 42. The same is true for the $0_e$, $1_e$, $2_e$, $0_f$, $1_f$ and $2_f$ inputs of multiplexer E1 shown in FIG. 3-G and the similar inputs $0_g$, $1_g$, $2_g$, $0_h$, $1_h$ and $2_h$ of multiplexer C1 which is shown in FIG. 3-H.

The multiplexers H1, F1, E1 and C1 are used in part to multiplex or gate the binary counts entered upon the manually settable switches shown in FIG. 3-J into the binary counters H3 and J3 shown in FIGS. 3-F and 3-G, respectively as previously described.

FIG. 3-J shows the arrangement of the manually settable switches which provides the up ramp data for accelerating the motor 22 from a rest position to the desired constant velocity. The up ramp data is organized in the following manner. The manually settable switches are shown in three column-type groupings entitled S3 for Step 0, S2 for Step 1, and S1 for Step 2. Because each grouping of switches is identical, only a description of the switches under the column marked S3 and enclosed in dashed rectangle 151 will be given.

Each group of manually settable switches enclosed in rectangle 151 in FIG. 3-J for example, is comprised of eight identical switches numbered consecutively from 9 through 16. One terminal of each of the switches 9 through 16 is connected to the system ground via a common conductor 153, and the other terminals of these switches are connected to the output terminals $0_h$, $0_g$, $0_f$, $0_e$, $0_d$, $0_c$, $0_b$, and $0_a$ respectively. Each of the outputs $0_h$ through $0_a$ is connected to a +5 volt source of potential through a 2K ohm resistor as shown, so that when each of the switches 9 through 16 is open, a positive output is placed on the associated output terminals $0_h$ through $0_a$ respectively, and when each of the switches is closed, the associated output terminals are placed at system ground. The switches marked 16 in FIG. 3-J represent the lowest order bit, and the switches marked 9 represent the highest order bit of an eight bit binary count which is recorded on each group of switches under the columns entitled S3, S2, and S1. it should be recalled from the general description of the operation of the speed control means 30 given in relation to FIG. 2, that the motor 22 is accelerated from an initial position of rest to approximately the desired velocity in three separate stages while under the control of the up ramp data and control means 42. The binary counts which are entered upon the groups of switches S3, S2, and S1 are 187, 187, 188 respectively, in the embodiment described; however, these values are merely illustrative and can be changed for different applications. These binary counts control the energizing on period for the motor 22 during the time that carriage means 12 is being accelerated from rest to a velocity approaching the desired velocity.

The manually settable switches shown in FIG. 3-J are connected to the multiplexers H1, F1, E1, and C1, in the following manner. The output of switch 16 shown under the column marked S3, is marked as $0_a$ and is fed into the $0_a$ input of multiplexer H1 shown in FIG. 3-E, and this input $0_a$ is also marked as S3-16. The output of switch 16, shown under the column marked as S2, is designated as $1_a$ and is fed into the $1_a$ input of multiplexer H1 shown in FIG. 3-E and this input $1_a$ is also marked S2-16. Similarly, the output of switch 16, shown under the column marked as S1, is designated as $2_a$ and is fed into the input $2_a$ of multiplexer H1 shown in FIG. 3-E and this input $2_a$ is also marked S1-16. The output of switch 9, shown under the column marked S1, is designated as $2_h$, and is fed into the input $2_h$ of multiplexer C1 shown in FIG. 3-H, and this input $2_h$ is also marked S1-9 on multiplexer C1. From these few illustrations, it is apparent how the remaining outputs of the various switches shown under the columns S3, S2, and S1 shown in FIG. 3-J are connected to the various remaining inputs of the multiplexers H1, F1, E1, and C1 shown respectively in FIGS. 3-E, 3-F, 3-G, and 3-H.

In addition to the multiplexing means H1, F1, E1 and C1 already described, the multiplexing means 44 shown in FIG. 2 also includes multiplexer G2 shown in FIG. 3-E, multiplexer H2 shown in FIG. 3-F, multiplexer J2 shown in FIG. 3-G, and multiplexer K2 shown in FIG. 3-H. The multiplexers G2, H2, J2 and K2 are all conventional Fairchild 9322 multiplexers which are equivalent to 4 pole, two-position switches.

The program data means 48 shown in FIG. 2 contains the binary count data relating to the de-energizing off period of motor 22 and includes the manually settable switches shown in FIGS. 3-E and 3-H. The group of switches S5 shown in FIG. 3-E and enclosed in the dashed rectangle 146 provides the low byte count data to the counter H3 shown in FIG. 3-F and the group of switches S5 shown in FIG. 3-H and enclosed in the dashed rectangle marked 148, provides the high byte count data to the counter J3 in FIG. 3-G. The data entered on the manually settable switches S5 shown in rectangles 146 and 148 provides an eight bit binary count for the off period of motor 22 when it is being driven in the forward direction. Similarly, the group of manually settable switches S4 shown in FIG. 3-E and enclosed in dashed rectangle 150 provides the low byte of data to the low byte counter H3 shown in FIG. 3-F. The group of manually settable switches marked S4 and enclosed in the dashed rectangle 152 in FIG. 3-H provides the high byte of data to the high byte counter J3 shown in FIG. 3-G. The switches S4 shown in dashed rectangles 150 and 152 are utilized to provide the eight bit binary count to the H3-J3 counter when the motor 22 is driven in a reverse direction, and the count relates to the off period of motor 22.

Because the groups of switches S4 and S5 shown in FIGS. 3-E and 3-H are identical, a discussion of one of these groups will suffice for all. With regard to group of switches S5 shown in FIG. 3-E, for example, there are four manually settable switches associated therewith. Each individual switch like switch 154, has one terminal 156 thereof connected to an input terminal such as $I_{1a}$ of multiplexer G2, and the other terminal 158 thereof is connected to a system ground. Each individual switch has its terminal 156 connected to a +5 volt source of potential through a 2K ohm resistor via junction 160. When the switch 154 is opened as shown in FIG. 3-E, a positive potential will be placed on the associated input $I_{1a}$ of the multiplexer G2, and when the switch 154 is closed, a ground reference potential will be placed on the associated input $I_{1a}$. The particular binary counts entered upon the groups of switches S4 and S5 will be described in detail later herein. Switch 154 shown in FIG. 3-E represents the low order bit, and switch 162 shown therein represents the high order bit for the 4-bits of data being entered on the group of switches enclosed in dashed rectangle 146. Because the operation of the groups of switches S4 and S5 is the same, they need not be described in any further detail.

The outputs of the manually settable switches of group S5 shown in dashed rectangle 146 in FIG. 3-E are fed into the inputs $I_{1a}$ through $I_{1d}$ of multiplexer G2, and the outputs of the manually settable switches of group S4, shown in dashed rectangle 150, are fed into the inputs $I_{0a}$ through $I_{0d}$ of multiplexer G2. Similarly, the manually settable switches of group S5, enclosed in rectangle 148 in FIG. 3-H, are fed into the inputs $I_{0a}$ through $I_{0d}$ of multiplexer G2. Similarly, the manually settable switches of group S5, enclosed in rectangle 148 in FIG. 3-H, are fed into the inputs $I_{1a}$ through $I_{1d}$ of multiplexer K2, and the outputs of the manually settable switches of group S4, enclosed in dashed rectangle 152, are fed into the inputs $I_{0a}$ through $I_{0d}$ of multiplexer K2.

The outputs of the multiplexer K2 shown in FIG. 3-H are fed into the multiplexer J2 shown in FIG. 3-G, and correspondingly, the outputs of the multiplexer G2 shown in FIG. 3-E are fed into the multiplexer H2 shown in FIG. 3-F. The multiplexer J2 handles the high byte data from the groups of switches S4 and S5 of FIG. 3-H, and correspondingly, the multiplexer H2 shown in FIG. 3-F handles the low byte data associated with the groups of switches S4 and S5 shown in FIG. 3-E. The multiplexers G2 and K2 control the forward and reverse binary count data forwarded to the multiplexers H2 and K2 via the S inputs thereto.

With regard to multiplexer K2 shown in FIG. 3-H, the $Z_a$ output thereof is fed into the $I_{0a}$ input of multiplexer J2 shown in FIG. 3-G via conductor 164. Similarly, the $Z_b$, $Z_c$, and $Z_d$ outputs of multiplexer K2 are fed into the $I_{0b}$, $I_{0c}$, and $I_{0d}$ inputs of multiplexer J2 via the conductors 166, 168, and 170, respectively.

The output $Z_a$ of multiplexer G2 shown in FIG. 3-E is fed into the $I_{0d}$ input of multiplexer H2 shown in FIG. 3-F via the conductor 172. Similarly, the outputs $Z_b$, $Z_c$, and $Z_d$ are fed into the $I_{0c}$, $I_{0b}$, and $I_{0a}$ inputs of multiplexer H2 via the conductors 174, 176, and 178 respectively.

The $Z_a$, $Z_b$, $Z_c$ and $Z_d$ outputs of multiplexer H2 shown in FIG. 3-F are fed into the $P_1$, $P_2$, $P_3$, and $P_4$ inputs, respectively of the counter H3. Similarly, the $Z_e$, $Z_f$, $Z_g$, and $Z_h$ outputs of multiplexer J2 shown in FIG. 3-G are fed into the P4, P5, P6, and P7 inputs of counter J3. The counter H3 and the counter J3 are both conventional Fairchild 9316 4-bit binary counters which are wired together to provide the 8-bit counter means H3-J3 shown in FIG. 2.

The $Z_a$ and $Z_b$ outputs of multiplexer H1 shown in FIG. 3-E are fed into the $I_{1a}$ and $I_{1b}$ inputs of multiplexer H2 shown in FIG. 3-F via conductors 180 and 182, respectively. Similarly, the $Z_c$ and $Z_d$ outputs of multiplexer F1 shown in FIG. 3-F are fed into the $I_{1c}$ and $I_{1d}$ inputs of multiplexer H2 via conductors 184 and 186, respectively.

The $Z_e$ and $Z_f$ outputs of multiplexer E1 shown in FIG. 3-G are fed into the $I_{1a}$ and $I_{1b}$ inputs of multiplexer J2 via conductors 188 and 190, respectively. The $Z_g$ and $Z_h$ outputs of multiplexer C1 shown in FIG. 3-H are fed into the $I_{1c}$ and $I_{1d}$ inputs of multiplexer J2 shown in FIG. 3-G via conductors 192 and 194, respectively.

The control means K3 along with the up ramp data and control means 42 shown in FIG. 2 are shown in more detail in FIG. 3-I. The control means K3 includes a conventional Fairchild 9024 dual $\overline{JK}$ flip-flop K3 which is used for switching the speed control means 30 of this invention alternately between the energizing on pulse and the de-energizing off pulse states for motor 22. The $\overline{\phi 1}$ clock coming from FIG. 3-F is fed into the CK input of flip-flop K3 via conductor 196. The terminal count TC output of high byte counter J3 shown in FIG. 3-G is fed into the J input of flip-flop K3 via conductor 198. The TC output from counter J3 is also fed into the conventional inverter E3 shown in FIG. 3-G, and the inverted output therefrom is fed into the K input of flip-flop K3 via conductor 200.

When the carriage means 12 is to be driven, the MOTOREN pulse coming from the printer control means 28 shown in FIG. 1 and also shown in FIG. 3-F is fed into the $C_D$ input of flip-flop K3 via conductor 202. This MOTOREN pulse resets the flip-flop K3, thereby providing a PLSWDON/ or "one" output on the $\overline{Q}$ output thereof and on conductor 203. The output pulse PLSWDON/ from flip-flop K3 is fed into a conventional inverter H4, and the inverted (PLSWDON) output therefrom is fed into the input of the motor drive means 26 shown in FIG. 1 via conductor 207. This PLSWDON pulse initiates the start of the energizing on pulse which is utilized by the motor drive means 26 to energize the motor 22 to begin moving the carriage means 12.

The MOTOREN pulse from the printer control means 28 is also fed into the $C_D$ inputs of flip-flops J1 and J1-1 via a conductor 209 which is joined to conductor 202 at junction 206 as shown in FIG. 3-I. The two flip-flops J1 and J1-1 are conventional Fairchild 9024 flip-flops which are utilized as a counter means for controlling or gating the "up-ramp" binary count data from the manually settable switches shown under the columns marked as S3, S2, and S1 in FIG. 3-J. In this regard, the $\overline{Q}$ output which is also marked $\overline{S0}$ of flip-flop J1 is connected to the J input thereof, and the $S_D$ input of flip-flop J1 is connected to the $S_D$ input of flip-flop J1-1 via conductor 208. The conductor 208 is connected to a source of +5 volts potential through a 2K ohm resistor at junction 210. The Q output of flip-flop J1-1, which is also marked S1, is fed into the K input of flip-flop J1 via conductor 211, and the same output is connected to the K input of flip-flop J1-1 via conductor 221 at junction 213. The CHPA pulse coming from the Q output of flip-flop F3-1 shown in FIG. 3-B is fed into the CP input of flip-flop J1 via conductor 88, and is also fed into the CP input of flip-flop J1-1 via the conductor 215.

The Q or S0 output of flip-flop J1 shown in FIG. 3-I is fed into the $S_0$ inputs of each of the multiplexers H1, F1, E1, and C1 shown respectively in FIGS. 3-E, 3-F, 3-G, and 3-H via conductor 214. Similarly, the Q or S1 output from flip-flop J1-1 shown in FIG. 3-I is fed into the $S_1$ inputs of each of the multiplexers H1, F1, E1, and C1 via conductor 216 which is connected to conductor 211 at junction 218.

As stated earlier herein, the flip-flops J1 and J1-1 are utilized for multiplexing the various binary count data entered on the manually settable switches shown under the columns marked S3, S2 and S1 in FIG. 3-J for controlling the up ramp operation of motor 22 when accelerating the carriage means 12 from a rest position to approximately the desired velocity. When the MOTOREN pulse is supplied from the printer control means 28, the flip-flops J1 and J1-1 shown in FIG. 3-I are both reset, thereby producing a "0" at the Q or S0 output of flip-flop J1 and similarly, a "0" output at the Q or S1 output of flip-flop J1-1. The 0 outputs from flip-flops J1 and J1-1 condition the multiplexers H1, F1, E1, and C1 shown in FIGS. 3-E, 3-F, 3-G, and 3-H respectively, to gate the binary count data entered on the manually settable switches under the column marked S3, Step 0 in FIG. 3-J into the multiplexers H2 and J2 shown in FIGS. 3-F and 3-G respectively. The count which is recorded on the manually settable switches 9 through 16 under Step 0 on FIG. 3-J presets the counter H3-J3 to the amount set thereon. The $\overline{\phi 1}$ clock derived from the timing pulse generation means 50 increments the counter H3-J3 from the preset amount thereon to its terminal count. When the terminal count of counter J3 is reached, a signal therefrom is routed over conductor 198 to the J input of flip-flop K3 causing it to change state. Accordingly, the $\overline{Q}$ output of flip-flop K3 becomes a zero or low and this output is fed over conductor 204 to the S inputs of multiplexers H2 and J2 shown in FIGS. 3-F and 3-G to condition them to gate data from the multiplexer G2 shown in FIG. 3-E and the multiplexer K2 shown in FIG. 3-H relative to the off period of the motor 22. Multiplexer G2 provides the low byte of the off width forward data from the group of switches enclosed in dashed rectangle 146 when a high level or forward input is on the S input thereof, and multiplexer K2 supplies the high byte of data for the off period of motor 22 from the group of switches enclosed in dashed rectangle 148 when a high or forward input is on the S input thereof. Off width data for the reverse direction of motor 22 is supplied when the S inputs to multiplexers G2 and K2 are at a low level. The high byte data from the multiplexer K2 is gated into the high byte counter J3 via the multiplexer J2, and similarly, the low byte data relative to the forward direction from the multiplexer G2 in FIG. 3-E is gated into the low byte counter H3 via the multiplexer H2 shown in FIG. 3-F. When the terminal count of counter J3 is reached, it causes the flip flop K3 to change state, thereby causing the binary count data recorded on the manually settable switches under the column marked S3, Step 0 is to be again multiplexed into the counter means H3-J3 as previously explained in relation to the general discussion related to FIG. 2.

After the first CHAR pulse coming from the sensing means 32 is received, the CHPA pulse derived therefrom is used to increment the flip flops J1 and J1-1 (which are connected together as a four bit binary counter) causing the SO or Q output from flip flop J1 to become a "1" and thereby condition the multiplexers H1, F1, E1 and C1 to gate the binary count data entered on the manually settable switches under the column S2, Step 1 in FIG. 3-J into the counter H3-J3 to preset it. After the terminal count of counter H3-J3 is reached, the data related to the de-energizing off period is multiplexed from the program data means 48 as previously explained.

As the motor 22 accelerates the carriage means 12 towards the desired velocity, second and third CHAR pulses will be received from the sensing means 32 and the second and third CHPA pulses derived therefrom will advance the counter means comprised of flip flops J1 and J1-1 in FIG. 3-I. The second CHPA pulse causes a "0" output on the SO or Q output of flip flop J1 and a "1" output on the S1 or Q output of flip-flop J1-1, thereby conditioning the multiplexers H1, F1, E1 and C1 to gate the binary count data entered on the manually settable switches under the column marked S1, Step 2 in FIG. 3-J into the counter H3-J3 as previously described. Similarly, the third CHPA pulse causes a "1" output to appear on the SO or Q output of flip flop J1 and the S1 or Q output of flip flop J1-1, thereby conditioning the multiplexers H1, F1, E1 and C1 to gate the binary count appearing on the latches C5 and D5 of FIG. 3-D into the counter H3-J3 in FIGS. 3-F and 3-G as previously described. The flip flops J1 and J1-1 remain in this state until they are reset again by the MOTOREN pulse, and while they are in the "1" state referred to, the multiplexers H1, F1, E1 and C1 will continue to gate the binary counts associated with or corresponding to the actual velocity of the carrier means 12 into the counter H3-J3 as previously described.

The 4-bit counters H3 and J3 shown in FIGS. 3-F and 3-G are wired together to provide an 8-bit counter as follows. The terminal count TC output from counter H3 is fed into the CET input of counter J3 with the CEP input thereof being connected to the CET input thereof. The CET and the CEP inputs of counter H3 are connected to the conductor 202 shown in FIG. 3-F. The CP input of counter H3 is connected to the $\overline{\phi1}$ clock at junction point 220 on conductor 196, and the master reset or MR input of counter H3 is connected to the conductor 202 at junction 222 for receiving the MOTOREN signal. The parallel enable or PE input of counter H3 and the PE input of counter J3 are connected via conductor 226 to the output of inverter E3 shown in FIG. 3-G at junction 224. The clock pulse or CP input of counter J3 is connected to the $\overline{\phi1}$ clock via conductor 196 at junction 228. The master reset or MR input of counter J3 receives the MOTOREN signal from conductor 202 at junction 230. Each of the counters H3 and J3 is connected to a source of +5 volts potential and a system ground as is conventionally done.

The $Z_a$, $Z_b$, $Z_c$, and $Z_d$ outputs of multiplexer H2 shown in FIG. 3-F are respectively fed into the $P_1$, $P_2$, $P_3$, and $P_4$ inputs of counter H3. Similarly, the $Z_e$, $Z_f$, $Z_g$, and $Z_h$ outputs of multiplexer J2 shown in FIG. 3-G are respectively fed into the $P_4$, $P_5$, $P_6$, and $P_7$ inputs of counter J3.

Before proceeding with a detailed discussion of the timing diagrams shown in FIGS. 5-A, 5-B, 5-C, and 5-D relating to the operation of the speed control means 30, it would be useful to discuss some of the design parameters involved in the selection of the various components and clocks used in the speed control means 30. A first consideration is the particular application to which the speed control means 30 is to be applied. In the embodiment shown in FIG. 1, the moveable member whose velocity is to be controlled is the carriage means 12 on which the wire matrix printer 14 is mounted. The particular wire matrix printer 14 was designed to print 100 characters per second. The particular format of the character printed thereby is a 7 by 12 matrix, meaning that the character itself is 7 dot positions high and 9 dot positions wide, with 3 dot positions being allowed for the spacing between adjacent characters. At a printing rate of 100 characters per second, 1200 pulses per second must be applied to the printer 14, and this means that the individual firing rate must be 8 microseconds per pulse.

Another factor to consider in the design of the speed control means 30, is the specific motor like 22 selected to drive the carriage means 12. For the specific embodiment shown, the motor 22 selected was a 12 volt, 3.4 amp permanent magnet field DC motor manufactured by American Bosch. The motor 22 maintained the desired constant velocity when the motor had a duty cycle of 25%. The response time of the motor 22 must also be taken into consideration, that is, the motor 22 and the associated motor drive means 26 must have a fast enough response time to respond to the changes in velocity dictated by the speed control means 30.

Another factor to consider is that the rate of the basic clock used in the speed control means 30 must be sufficiently fast for the period of the on pulse width of motor 22 in order to obtain the desired accuracy from the system. With all these factors in mind, the selection of the actual components and clocks used in the speed control means 30 was the result of an iterative process.

FIGS. 5-A, 5-B, 5-C and 5-D taken together show the various timing diagrams used with this invention. The basic clock $\overline{\phi1}$ shown in FIGS. 3-A and 3-F is derived from the Q1.F clock from the printer control means 28 shown in FIG. 1. The HCKA and the HCKAB clocks are derived from the divide by 16 counter F2 shown in FIG. 3-A.

The HCKAB clock shown in line 228 in FIGS. 5-A and 5-B is the same as the one shown above it; however the clock shown on line 228 is greatly reduced in scale. The CHARA pulse is derived from the CHAR pulse coming from the sensing means 32 of FIG. 1, and the CHARB pulse is produced (from flip flop F3 in FIG. 3-B) when the next HCKAB pulse occurs. The CHPA pulse coming from flip flop F3-1 in FIG. 3-B is produced from the CHARB pulse, and it is terminated on the next HCKAB pulse. The CHPB pulse is produced on the fall of the CHPA pulse and it is terminated on the rise of the next HCKAB pulse.

THE HCKAB clock shown on line 230 in FIGS. 5-A and 5-B is the same as the one on line 228; however, it is again reduced in size to facilitate the showing of associated pulses. The CHPA pulse shown on line 232 is used to condition the associated latches C5 and D5 shown in FIG. 3-D so as to latch the count (related to the actual velocity of carriage means 12) from the counter means C2-D2 shown in FIG. 3-C on the fall of the CHPA pulse or CHPA/; this makes the count available for gating into the counter means H3-J3 as previously explained. The CHPB pulse on line 231 which follows the CHPA pulse is used to reset or clear the counter means C2-D2 to enable it to start accumulating a new count thereon. The HCKB clock is derived from the HCKAB clock via the divide by six counter F4 shown in FIG. 3-B and is used for incrementing the counter means C2-D2, and the divide by six counter F4 is reset by the CHPA/ pulse coming from the flip flop F3-1 shown in FIG. 3-B.

The line marked VCTB in FIGS. 5-A and 5B represents the ones' complement count (corresponding to actual velocity of carriage means 12) which is accumulated in the counter means C2-D2 between successive CHAR pulses coming from sensing means 32 in FIG. 1.

The VCTB count coming from the latch means C5-D5 shown in FIG. 3-D is used for the generation of firing pulses FPLS, with each firing pulse occurring when the terminal count of counter D4 is reached. On the average, there are six firing pulses FPLS which occur between two consecutive CHAR pulses coming from the velocity sensing means 32, and the clock HCKAB which increments the counter means C4-D4 is six times faster than the HCKB clock which increments the counter means C2-D2. For example, assume that the motor 22 is driving the carriage means 12 at the desired velocity, which means that a binary count of 71 will be recorded on the counter means C2-D2 between successive CHAR pulses from the velocity sensing means 32 as indicated in the example given earlier herein, and the ones' complement thereof or a binary count of 184 will be latched in the latch means C5-D5. This binary count of 184 is preset into the counter means C4-D4 causing is to be incremented from 184 to 255, the terminal count thereof, by 71 HCKAB clock pulses. When the terminal count of counter means C4-D4 is reached, a firing pulse FPLS coming from the TC output of counter D4 is utilized by the printer control means 28 to conventionally fire one of the solenoids associated with the wire matrix printer 14. The TC output from the counter D4 is inverted by the NOR gate in FIG. 3-D and is fed into the PE inputs of counter means C4-D4 to condition it to again receive the binary count of 184 which is still latched on the latch means C5-D5. The counter means C4-D4 is again incremented by 71 HCKAB clock pulses until the terminal count thereof is reached, causing the second firing pulse FPLS to occur. This process is repeated until the next CHAR pulse from the velocity sensing means 32 occurs, causing a new actual velocity count VCTB to appear on the latch means C5-D5 (assuming the actual velocity of the carriage means 32 changes). A synchronizing pulse COLSYN.G/ coming from the printer control means 28 (FIG. 1) is also fed into the NOR gate U4 in FIG. 3-D to provide the synchronization necessary for the start of a new character to be printed by the wire matrix printer 14. The technique just described provides a very accurate control of the firing pulses FPLS, as each group of six such firing pulses is directly related to the actual velocity of the carriage means 12 as reflected by the binary count recorded in the counter means C2-D2 which occurred between the last two successive CHAR pulses.

The PLSWDON pulses shown in FIGS. 5-A and 5-B are greatly enlarged in scale to illustrate the energizing on period at 233 and the de-energizing off period at 234. The energizing on period 233 may vary depending upon whether an overspeed or underspeed condition exists with regard to the carriage means 12; however, the de-energizing or off period is constant. When the carriage means 12 is moving at the desired velocity, the duration of the on period 233 is equivalent to 71 $\phi 1$ pulses, and the duration of off period 233 is equivalent to 213 $\phi 1$ pulses in the example given earlier herein.

The motor engage pulse, MOTOREN, is shown in FIGS. 5-C and 5-D and is used to energize the motor 22 to accelerate the carriage means 12 from a rest position towards the desired velocity and to reset the flip flops J1 and J1-1 (FIG. 3-I), causing the binary count from the manually settable switches of Step 0 (FIG. 3-J) to be gated into the counter means H3-J3 as previously described. The S0 and S1 lines shown in FIGS. 5-C and 5-D relate to the outputs S0 and S1 of flip flops J1 and J1-1, respectively, for controlling the various binary counts gated into the counter means H3-J3. As previously stated, there are about 5 or 6 alternate energizing on pulses PLSWDON and de-energizing off pulses which occur (on line 236 in FIG. 5-C) before the carrige means 12 has moved sufficiently far to produce a first CHAR pulse and the first related CHPA shown on line 238 in FIG. 5-C. The first CHPA pulse terminates Step 0 and initiates Step 1, and similarly, the second CHPA pulse terminates Step 1 and initiates Step 2. The third CHPA pulse terminates Step 2 and initiates the transference of the VCTB counts from the counter means C2-D2 as previously described. The desired velocity of motor 22 is shown by the dashed line 240 and the actual velocity is shown at line 242. It is apparent that the various steps Step 0, Step 1, and Step 2 control the acceleration of the carriage means 12 or motor 22 from a rest position to approximately the desired velocity, and thereafter, the actual velocity of the carriage means 12 is controlled by the count appearing in counter means C2-D2. This is also apparent from the S0 and S1 outputs of flip flops J1 and J1-1 remaining at the high level upon the occurrence of the third CHPA pulse shown on FIG. 5-D, which high level conditions the multiplexers H1, F1, E1, and C1 to gate the binary counts from latch means C5-D5 into the counter means H3-J3.

The CHPA pulses on line 244, the FPLS pulses on line 246, and the PLSWDON pulses on line 248 are shown together again in FIGS. 5-C and 5-D to emphasize the relationship therebetween as they relate to the wire matrix printer 14 shown in FIG. 1. In general, the time period from the motor 22 being at rest until the first CHPA pulse is received is dependent upon where the carriage means 12 is located in relation to the next slot in the timing strip 38. Upon the occurrence of the first CHPA pulse, the velocity of the carriage means 12 (and motor 22) is greater than zero but is less than the desired velocity 240 which can be reached in moving the carriage means 12 a distance which represents half a character to be printed by the wire matrix printer 14. The torque generated by Step 0 for accelerating motor 22 must be greater than the minimum required starting torque but not greater than a value required to achieve the desired velocity in the distance available, that is the velocity of the motor 22 when the first CHPA pulse occurs should be kept at a minimum. By the time the third CHPA pulse is received, the motor 22 should have reached the desired velocity.

The various binary counts entered upon the various manually-settable switches to effect the desired velocity of motor 22 and the carriage means 12 are as follows:

| Manually Settable Switches | Binary Count Entered Thereon |
|---|---|
| S3, Step 0 in FIG. 3-J | 187 |
| S2, Step 1 in FIG. 3-J | 187 |
| S1, Step 2 in FIG. 3-J | 188 |
| S4 enclosed in dashed rectangle 150 in FIG. 3-E; off reverse, low byte | 6 |
| S5 enclosed in dashed rectangle 146 in FIG. 3-E; off forward, low byte | 15 |
| S4 enclosed in dashed rectangle 152 in FIG. 3-H; off reverse, high byte | 15 |
| S5 enclosed in dashed rectangle 148 in FIG. 3-H; off forward, high byte | 11 |

The binary count of 6 entered upon the reverse, low byte switches enclosed in rectangle 150 and the binary count of 15 entered upon the high byte switches enclosed in rectangle 152 combine when fed into the binary counter means H3-J3 to produce a binary count of 246 therein. Similarly, a binary count of 15 entered upon the forward low byte switches enclosed in rectangle 146 and the binary count of 11 entered upon the forward high byte switches enclosed in rectangle 148 combine when fed into the binary counter means H3-J3 to produce a binary count of 191 therein.

In certain speed settings, the control means 30 may become unstable, i.e., the instantaneous velocity of the carriage means 12 tends to oscillate about the desired velocity. Should this occur, a small damping resistor such as a two ohm resistor may be placed in series with the winding of the motor 22. This damping resistor (not shown) increases the time required for the motor 22 to increase the velocity of the carriage means 22 and also decreases the time required for the carriage means 22 to slow down.

When the damping resistor is placed in series with the motor winding of the motor 22, the energizing on period or duty cycle for the motor 22 becomes approximately fifty percent when moving the carriage means 12 in a forward direction instead of the 25 percent duty given in the illustration cited earlier herein, and the duty cycle for the reverse direction is approximately ninety percent.

All of the data transfer within the control means 30 is effectively synchronous with the $\phi 1$ clock so that only valid data is transferred.

What is claimed is:

1. A driving means comprising:
    means for sensing the actual velocity of a moveable member whose velocity is to be controlled;
    motor drive means including a motor for driving said moveable member; and
    digital circuit means operatively coupling said sensing means and said motor drive means for controlling the duration of an energizing pulse to said motor drive means to enable said motor to drive said moveable member at a desired constant velocity;
    said circuit means including means for inversely varying the duration of said energizing pulse in accordance with said actual velocity; and
    said means for inversely varying the duration of said energizing pulse including a digital counter with means for alternately presetting said counter with a first count which corresponds to a desired off period for said motor and with a second count which is inversely related to the actual velocity of said moveable member.

2. A driving means comprising:
    means for generating signals which are indicative of the actual velocity of a moveable member whose velocity is to be controlled;
    motor drive means including a motor for driving said moveable member; and
    circuit means operatively coupling said signal generating means and said motor drive means for controlling the duration of an energizing pulse to said motor drive means to enable said motor to drive said moveable member at a desired constant velocity;
    said circuit means being completely digital and including means for inversely varying the duration of said energizing pulse in accordance with a time period measured between predetermined signals from said signal generating means;
    said means for inversely varying the duration of said energizing pulse including a binary counter with means for presetting said binary counter with a first count which corresponds to a desired off period for said motor and with a second count which is inversely related to the actual velocity of said moveable member whereby said duration of said energizing pulse is decreased when said moveable member has a velocity which is greater than a desired velocity and said duration of said energizing pulse is increased when said moveable member has a velocity which is less than said desired velocity.

3. A driving means comprising:
    means for generating signals which are indicative of the actual velocity of a moveable member whose velocity is to be controlled;
    motor drive means including a motor for driving said moveable member;
    a digital circuit operatively coupling said signal generating means and said motor drive means for producing a first waveform comprising first pulses and portions interconnecting said first pulses; said first pulses having widths which vary inversely according to the time intervals between successive predetermined signals from said signal generating means for controlling the velocity of said moveable member at a desired constant velocity;
    said digital circuit comprising:
    a counter;
    means for alternately loading said counter with first counts which inversely correspond to said time intervals between said successive predetermined signals and second counts which correspond to said portions;
    means for incrementing said counter from said first and second counts loaded therein to the terminal count thereof; and control means for receiving terminal count outputs from said counter when the terminal count thereof is reached and for producing first and second outputs therefrom which comprise said first waveform, with said first outputs representing said widths of said first pulses and said second outputs representing said portions, whereby upon receiving a terminal count associated with one of said first or second counts, said control means causes said loading means to load the other of said first or second counts into said counter; said first pulses and said portions being used by said motor drive means to respectively energize and deenergize said motor.

4. The driving means as claimed in claim 3 in which said loading means comprises:
means for producing third counts which directly correspond to said time intervals between said successive predetermined signals; and
means for inverting said third counts to produce said first counts.

5. The driving means as claimed in claim 4 in which said producing means includes:
a binary counter; and
second means for incrementing said binary counter with a clocking pulse for a period measured between said successive predetermined signals to produce said third counts; and
said inverting means comprises:
a plurality of inverters connected to said binary counter for inverting said third counts from said binary counter; and
latch means connected to said plurality of inverters for storing therein the ones' complement of said third counts which become said first counts.

6. The driving means as claimed in claim 5 in which said loading means further comprises settable means for recording thereon said second counts, and multiplexing means for alternately multiplexing said first and second counts into said counter.

7. A driving means comprising:
means for generating signals which are indicative of the actual velocity of a moveable member whose velocity is to be controlled relative to a desired constant velocity;
motor drive means including a motor for operatively moving said moveable member; and
circuit means operatively coupling said signal generating means and said motor drive means for controlling the durations of an energizing on period and a de-energizing off period to said motor drive means to enable said motor to move said moveable member at said desired constant velocity, and comprising:
first means for producing a count which is related to the actual velocity of said moveable member as determined by predetermined successive signals from said signal generating means;
second means for producing a predetermined count which corresponds to said de-energizing off period;
a counter for receiving a predetermined count therein and for producing an output therefrom when the terminal count thereof is reached upon the application of clocking pulses thereto;
control means receiving the output from said counter and alternately switching between first and second states in response to each said output from said counter means; and
third means for receiving said counts from said first and second means and transferring said counts to said counter in response to said first and second states of said control means, whereby said control means when in said first state causes said third means to transfer said count from said first means into said counter means to initiate the start of said energizing on period, whereupon said counter means upon reaching said terminal count, causes said control means to switch to said second state thereby terminating said energizing on period and causing said third means to transfer said count from said second means into said counter to initiate the start of said de-energizing off period, whereupon said counter upon reaching said terminal count causes said control means to switch to said first state thereby terminating said de-energizing off period and causing said third means to transfer said count from said first means into said counter to thereby cause said motor to alternately switch between said energizing on period and said de-energizing off period;
said count produced by said first means being inversely proportional to the actual velocity of said moveable member so as to shorten or lengthen the duration of said energizing on period when the actual velocity thereof is respectively greater or less than said desired velocity.

8. The driving means as claimed in claim 7 in which said first means comprises:
a binary counter having a plurality of stages;
means for producing a first count in said binary counter which said first count directly corresponds to the actual velocity of said moveable member as determined between successive signals from said generating means;
a latch having a number of stages corresponding to the number of stages in said binary counter; and
an inverter for each said stage of said binary counter connecting each said stage of said binary counter with a corresponding said stage of said latch whereby the ones' complement count of said first count is recorded in said latch; said ones' complement count being said count produced by said first means.

9. The driving means as claimed in claim 8 in which said counter is a binary counter having a number of stages equal to the number of stages of said binary counter in said first means, and in which said control means includes a flip flop.

10. The driving means as claimed in claim 9 in which said second means includes settable switches on which said predetermined count corresponding to said de-energizing period is entered.

11. The driving means as claimed in claim 10 in which said third means includes multiplexers.

12. The driving means as claimed in claim 7 further comprising up-ramp means for accelerating said moveable member from a position of rest to approximately said desired constant velocity.

13. The driving means as claimed in claim 12 in which said up ramp means includes a second control means which enables said third means to receive said counts from said first and second means and to transfer said counts to said counter after said moveable member is accelerated to approximately said desired constant velocity by said up-ramp means.

14. An apparatus for digitally controlling the velocity of a moveable member relative to a desired constant velocity by controlling the duration of an energizing on pulse and a de-energizing off pulse to a motor which is operatively moving said moveable member comprising:
means for counting;
first means for loading said counting means with a first count which is inversely correlated to the actual velocity of said moveable member;
means for incrementing said counting means having said first count therein until the terminal count thereof is reached;
second means for loading said counting means with a second count which corresponds to the duration of said de-energizing off period, whereupon said incrementing means increments said counting means until the terminal count thereof is reached; and
means for utilizing said terminal counts from said counting means as derived from said first and second counts to control the termination of said energizing on pulse and said de-energizing off pulse, respectively, whereby said terminal count derived from said first count causes said second loading means to load said second count into said counting means and said terminal count derived from said second count causes said first loading means to load said first count into said counting means.

15. A digital circuit for producing a first waveform comprising first pulses having widths which vary inversely according to the time intervals between successive predetermined pulses of a second waveform and also having portions interconnecting said first pulses for controlling a utilization device, comprising:
a counter;
means for alternately loading said counter with first counts which inversely correspond to said time intervals between said successive predetermined pulses of said second waveform and second counts which correspond to said portions of said first waveform;
means for incrementing said counter from said first and second counts loaded therein to the terminal count thereof; and
control means for receiving terminal count outputs from said counter when the terminal count thereof is reached and for producing first and second outputs therefrom which comprise said first waveform, with said first outputs representing said widths of said first pulses and said second outputs representing said portions of said first waveform, whereby upon receiving a terminal count associated with one of said first or second counts, said control means causes said loading means to load the other of said first or second counts into said counter.

16. The digital circuit as claimed in claim 15 in which said loading means comprises:
means for producing third counts which directly correspond to said time intervals between said successive predetermined pulses of said second waveform; and
means for inverting said third counts to produce said first counts which inversely correspond to said third counts.

17. The digital circuit as claimed in claim 16 in which said producing means includes:

a binary counter; and
second means for incrementing said binary counter with a clocking pulse for a period between said successive predetermined pulses of said second waveform to produce said third counts; and
said inverting means comprises:
a plurality of inverters connected to said binary counter for inverting said third counts from said binary counter; and
latch means connected to said plurality of inverters for storing therein the ones' complement of said third counts which become said first counts.

18. The digital circuit as claimed in claim 17 in which said loading means further comprises:
settable means for recording thereon said second counts and multiplexing means for alternately multiplexing said first and second counts into said counter.

19. A printer comprising:
a platen;
a print head;
motor drive means including a motor for moving said print head in operative relationship with said platen;
means for sensing the actual velocity of said print head; and
circuit means operatively coupling said sensing means and said motor drive means for controlling the duration of an energizing pulse to said motor drive means to enable said motor to drive said print head at a desired constant velocity;
said circuit means being completely digital and including means for inversely varying the duration of said energizing pulse in accordance with said actual velocity.

20. A circuit for producing a fixed number of timing pulses within varying time periods as measured between predetermined successive signals so that said fixed number of timing pulses are equally spaced within said varying time periods, comprising:
a counter;
means for producing a count in said counter which said count directly corresponds to one of said time periods by incrementing said counter at a first rate;
a second counter;
means for loading said second counter with the ones' complement count of said first named count and incrementing said second counter at a second rate from said ones' complement count to the terminal count thereof to produce a terminal count output which represents one of said timing pulses and for clearing and loading said second counter with said ones' complement count whereby said fixed number of said timing pulses is produced in one of said time periods, said second rate being faster than said first rate by a multiple which is equal to said fixed number.

21. A circuit for producing timing pulses for energizing a printer having a plurality of printing elements, comprising:
motor drive means including a motor for moving said printer and an associated platen relative to each other at a desired velocity;
means for generating signals which are indicative of the actual velocity between said printer and said associated platen;
circuit means operatively coupling said generating means and said motor drive means for controlling the duration of an energizing pulse to said motor drive means to enable said motor to move said printer and platen relative to each other at a desired constant velocity;

said circuit means being completely digital and including means for inversely varying the duration of said energizing pluse in accordance with a time period measured between predetermined successive signals from said generating means;

said inversely varying means comprising:

a counter;

means for producing a count in said counter which directly corresponds to said time period by incrementing said counter at a first rate;

means for producing and storing the ones' complement count of said count;

a second counter for receiving said ones' complement count;

means for incrementing said second counter from said ones' complement count loaded therein to its terminal count to provide one of said timing pulses for actuation of a said printing element each time said terminal count is reached;

said incrementing means having an incrementing rate which is faster than said first rate by a fixed multiple which enables a predetermined number of terminal counts in said second counter to be reached in each said time period by repeatedly loading said second counter with said ones' complement count to enable said resulting timing pulses to be equally spaced within a said time period and produced at a rate which corresponds to said actual velocity between said printer and associated platen.

22. A method of digitally controlling the velocity of a moveable member relative to a desired velocity by controlling the durations of an energizing on pulse and a de-energizing off period to a motor which is operatively moving said moveable member, comprising the steps of:
(a) loading a counter with a first count which is inversely correlated to the actual velocity of said moveable member;
(b) incrementing said counter with said first count therein until the terminal count thereof is reached;
(c) loading said counter with a second count which corresponds to the duration of said de-energizing off period;
(d) incrementing said counter with said second count therein until the terminal count thereof is reached; and
(e) utilizing said terminal counts from said steps (b) and (d) to control the termination of said energizing on pulse and said de-energizing off period respectively to said motor whereby said terminal count associated with said second count causes the loading of said counter with said first count and said terminal count associated with said first count causes the loading of said counter with said second count.

23. The method as claimed in claim 22 in which said loading steps are effected by multiplexing.

24. The method as claimed in claim 23 in which said first count of said loading step (a) is derived by:
(f) generating pulses at a rate which is indicative of the actual velocity of said moveable member;
(g) incrementing a second counter so as to obtain a count therein which accrues between predetermined successive pulses from step (f); and
(h) taking the ones' complement of said count in said second counter to produce said first count.

25. The method as claimed in claim 24 in which said loading step (c) is effected by using the same count.

26. A method of producing a first waveform comprising first pulses and portions interconnecting said first pulses, with said first pulses having widths which vary inversely according to the time intervals between successive predetermined pulses of a second waveform comprising the steps of:
(a) loading a counter with a first count which inversely corresponds to said time interval between said successive predetermined pulses of said second waveform;
(b) incrementing said counter with said first count therein until the terminal count thereof is reached;
(c) loading said counter with a second count which corresponds to the duration of one of said portions of said first waveform;
(d) incrementing said counter with said second count therein until the terminal count thereof is reached; and
(e) utilizing said terminal counts from steps (b) and (d) to control the terminations of said first pulse and the duration of said portion respectively, whereby the said terminal count associated with said second count causes the loading of said counter with said first count and said terminal count associated with said first count causes the loading of said counter with said second count.

* * * * *